United States Patent
Matsushita et al.

(10) Patent No.: US 9,405,235 B2
(45) Date of Patent: Aug. 2, 2016

(54) RESIN COMPOSITION, SEAMLESS BELT, AND IMAGE FORMING APPARATUS

(71) Applicants: Makoto Matsushita, Osaka (JP); Akira Izutani, Osaka (JP); Chiyoshi Nozaki, Shizuoka (JP)

(72) Inventors: Makoto Matsushita, Osaka (JP); Akira Izutani, Osaka (JP); Chiyoshi Nozaki, Shizuoka (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/185,055

(22) Filed: Feb. 20, 2014

(65) Prior Publication Data
US 2014/0243465 A1 Aug. 28, 2014

(30) Foreign Application Priority Data
Feb. 27, 2013 (JP) ................... 2013-036991

(51) Int. Cl.
C08L 23/12 (2006.01)
C08L 27/16 (2006.01)
G03G 15/16 (2006.01)
C08L 23/00 (2006.01)
H01B 1/20 (2006.01)
H01B 1/24 (2006.01)
C08F 255/02 (2006.01)
C08L 53/00 (2006.01)
C08L 51/06 (2006.01)

(52) U.S. Cl.
CPC ............ *G03G 15/162* (2013.01); *C08F 255/02* (2013.01); *C08L 23/00* (2013.01); *C08L 23/12* (2013.01); *C08L 27/16* (2013.01); *H01B 1/20* (2013.01); *H01B 1/24* (2013.01); *C08K 2201/001* (2013.01); *C08L 51/06* (2013.01); *C08L 53/00* (2013.01)

(58) Field of Classification Search
USPC ............................. 524/502, 80, 504
See application file for complete search history.

(56) References Cited

U.S. PATENT DOCUMENTS

| 8,110,330 B2 | 2/2012 | Ishikawa et al. |
| 8,338,066 B2 | 12/2012 | Nozaki et al. |
| 8,526,864 B2 | 9/2013 | Nakagawa et al. |
| 2001/0036997 A1 | 11/2001 | Usui et al. |

(Continued)

FOREIGN PATENT DOCUMENTS

| EP | 1142918 A1 * | 10/2001 |
| EP | 1142918 A1 | 10/2001 |

(Continued)

OTHER PUBLICATIONS

European Search Report dated Jun. 18, 2014 in corresponding European patent application No. 2008-98345.

(Continued)

*Primary Examiner* — Peter D Mulcahy
*Assistant Examiner* — Henry Hu
(74) *Attorney, Agent, or Firm* — Cooper & Dunham LLP

(57) ABSTRACT

Provided is a resin composition including at least: polyolefin in an amount of from 50% by mass to 90% by mass; an electro-conductive agent; and a compound represented by General Formula (1) below, $$Y_1 \mathord{-}\!\!\!\mathord{-}\!\!\!\mathord{-}[ W_1 \mathord{-} R \mathord{-} W_2 \mathord{-}\!\!\!\mathord{-}\!\!\!\mathord{-}[ X \mathord{-} O ]_m ]_l Y_2 .$$

General Formula (1)

In General Formula (1), R is preferably a divalent group having a number overage molecular weight of 1,000 or greater and derived from acrylic polymer.

5 Claims, 4 Drawing Sheets

(56) References Cited

U.S. PATENT DOCUMENTS

| | | |
|---|---|---|
| 2003/0130378 A1 | 7/2003 | Urata et al. |
| 2006/0204882 A1 | 9/2006 | Nozaki et al. |
| 2006/0210902 A1 | 9/2006 | Nakamura et al. |
| 2006/0226572 A1 | 10/2006 | Tanaka et al. |
| 2007/0059625 A1 | 3/2007 | Yamamoto et al. |
| 2007/0122729 A1 | 5/2007 | Katoh et al. |
| 2007/0166635 A1 | 7/2007 | Yamamoto et al. |
| 2007/0190442 A1 | 8/2007 | Nakamura et al. |
| 2007/0218384 A1 | 9/2007 | Matsumoto et al. |
| 2007/0218388 A1 | 9/2007 | Kurose et al. |
| 2007/0218390 A1 | 9/2007 | Nozaki et al. |
| 2007/0218393 A1 | 9/2007 | Nozaki et al. |
| 2008/0032223 A1 | 2/2008 | Yamamoto et al. |
| 2008/0069594 A1 | 3/2008 | Izutani |
| 2008/0069599 A1 | 3/2008 | Nakamura et al. |
| 2008/0069617 A1 | 3/2008 | Matsumoto et al. |
| 2008/0076054 A1 | 3/2008 | Nozaki et al. |
| 2008/0081273 A1 | 4/2008 | Murakami et al. |
| 2008/0096119 A1 | 4/2008 | Yamamoto et al. |
| 2008/0124635 A1 | 5/2008 | Nakamura et al. |
| 2008/0176159 A1 | 7/2008 | Matsumoto et al. |
| 2008/0220357 A1 | 9/2008 | Nozaki et al. |
| 2008/0226997 A1 | 9/2008 | Nakamura et al. |
| 2008/0227001 A1 | 9/2008 | Kadota et al. |
| 2008/0227013 A1 | 9/2008 | Kadota et al. |
| 2008/0227016 A1 | 9/2008 | Nozaki et al. |
| 2008/0232849 A1 | 9/2008 | Izutani et al. |
| 2008/0232857 A1 | 9/2008 | Matsumoto et al. |
| 2008/0232864 A1 | 9/2008 | Izutani et al. |
| 2008/0233497 A1 | 9/2008 | Yamamoto et al. |
| 2008/0233510 A1 | 9/2008 | Nozaki et al. |
| 2008/0233511 A1 | 9/2008 | Ishikawa et al. |
| 2009/0017391 A1 | 1/2009 | Yamamoto et al. |
| 2009/0060540 A1 | 3/2009 | Matsushita et al. |
| 2009/0142107 A1 | 6/2009 | Akira et al. |
| 2009/0180791 A1 | 7/2009 | Matsushita et al. |
| 2009/0186289 A1 | 7/2009 | Nakamura et al. |
| 2009/0190949 A1 | 7/2009 | Hamahashi et al. |
| 2009/0220879 A1 | 9/2009 | Matsumoto et al. |
| 2009/0232542 A1 | 9/2009 | Yamamoto et al. |
| 2009/0233199 A1 | 9/2009 | Nozaki et al. |
| 2009/0238585 A1 | 9/2009 | Hayashi et al. |
| 2009/0257792 A1 | 10/2009 | Nakamura et al. |
| 2009/0279909 A1 | 11/2009 | Matsushita et al. |
| 2009/0297975 A1 | 12/2009 | Ishikawa et al. |
| 2009/0324270 A1 | 12/2009 | Yamashita et al. |
| 2010/0150609 A1 | 6/2010 | Nozaki et al. |
| 2010/0227265 A1 | 9/2010 | Matsumoto et al. |
| 2010/0272481 A1 | 10/2010 | Yamamoto et al. |
| 2010/0296848 A1 | 11/2010 | Yamamoto et al. |
| 2011/0008069 A1 | 1/2011 | Matsushita et al. |
| 2011/0045401 A1 | 2/2011 | Murakami et al. |
| 2011/0217644 A1 | 9/2011 | Yamamoto et al. |
| 2011/0217653 A1 | 9/2011 | Izutani et al. |
| 2011/0249994 A1 | 10/2011 | Matsushita et al. |
| 2012/0237270 A1 | 9/2012 | Juri et al. |
| 2012/0294657 A1 | 11/2012 | Matsushita et al. |

FOREIGN PATENT DOCUMENTS

| | | | |
|---|---|---|---|
| EP | 1300443 A1 | | 4/2003 |
| IE | 20060545 A1 | | 5/2007 |
| JP | 2006-313308 | * | 11/2006 |
| JP | 2007-148325 | * | 6/2007 |
| JP | 2007-241089 | * | 9/2007 |
| JP | 2007-326891 | * | 12/2007 |
| JP | 2011-186035 | * | 9/2011 |
| JP | 4834523 | | 9/2011 |

OTHER PUBLICATIONS

Dec. 1, 2015 Chinese official action in connection with corresponding Chinese patent application No. 201410068831.2.

* cited by examiner

RESIN COMPOSITION, SEAMLESS BELT, AND IMAGE FORMING APPARATUS

BACKGROUND OF THE INVENTION

1. Field of the Invention

The present invention relates to a resin composition, a seamless belt, and an image forming apparatus.

2. Description of the Related Art

Conventionally, image forming apparatuses such as copiers, printers, and facsimile machines configured to form images by electrophotography or electrostatic printing have employed electro-conductive seamless belts for various purposes, including transfer belts such as intermediate transfer belts, conveyor belts, fixing belts, and developing belts.

Main examples of means for adjusting electric resistance of a resin composition include a method of utilizing an electron conductive effect and a method of utilizing an ion conductive effect. As a transfer belt, it is preferable to use a material in an intermediate resistance range (from $10^6 \Omega/\square$ to $10^{11} \Omega/\square$ in terms of surface resistivity). In order to adjust volume resistance of a transfer belt, a resistance controlling agent such as an electro-conductive agent and an ion conductive agent is dispersed in a resin composition.

The method of utilizing an electron conductive effect adds an electro-conductive agent to the resin composition to adjust electric resistance. Generally, this method uses electro-conductive carbon black as the electro-conductive agent. However, in the intermediate resistance range, the amount of change in the surface resistivity rge relative to the amount of change in the additive amount of the electro-conductive carbon black. Therefore, resistance adjustment is difficult with so electro-conductive carbon black.

Further, it is very difficult to disperse an electro-conductive agent in the resin composition uniformly. A transfer belt of which resistance is adjusted according to this method may produce image failures such as white voids and leaks due to unevenness of the electric resistance in the belt.

Furthermore, when the electro-conductive agent is other than carbon black, such as zinc oxide, it is necessary to add the electro-conductive agent in a large amount in order to adjust the surface resistivity in the intermediate resistance range. Addition thereof in a large amount makes the resin composition largely voltage-dependent and brittle to greatly degrade the shapability of the resin composition.

On the other hand, the method of utilizing an ion conductive effect adds an ion conductive agent such as surfactant to the resin composition. This method has a problem that the concentration of the ion conductive agent lowers along with continued electricity application, to thereby change the surface resistivity. Another problem is that the surface resistivity greatly changes according to the temperature and humidity conditions.

There is proposed an electrophotography endless belt that includes a layer made of a resin composition containing: at least one kind of resin selected from the group consisting of polyetheresteramide, polyolefinether, and polyetheramide: polyvinylidene fluoride; and carbon (see Japanese Patent Application Laid-Open (JP-A) No. 2006-313308).

However, the surface resistivity of this proposed belt cannot be lowered unless polyether resin is added in a large amount. As a result of adding polyether resin in a large amount, there occurs a problem that mechanical strength and flame retardancy degrade.

SUMMARY OF THE INVENTION

The present invention aims to solve the conventional problems described above and achieve the following object. An object of the present invention is to provide a resin composition that has a suppressed voltage dependency, and of which electric resistance in the intermediate resistance range (from $10^6 \Omega/\square$ to $10^{11} \Omega/\square$ in terms of surface resistivity) is easy to adjust even when containing an electro-conductive agent in a small additive amount, that has excellent tensile elongation at break, and from which a desired amount of reflection light can be obtained.

Means for solving the problems is as follows, for example.

A resin composition of the present invention includes at least polyolefin in an amount of from 50% by mass to 90% by mass, an electro-conductive agent, and a compound represented by General Formula (1) below General Formula (1)

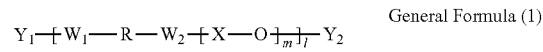

In General Formula (1), l and m represent natural numbers. R represents straight-chain or branched alkylene group having 20 or more carbon atoms, a divalent group having a number average molecular weight of 1,000 or greater and represented by General Formula (2) below, or a divalent group derived from acrylic polymer, polyurethane, or polyamide and having a number average molecular weight of 1,000 or greater when m is 20 or greater, or R represents a divalent group having a number average molecular weight of 1,000 or greater and represented by General Formula (2) below when m is 19 or less. $Y_1$ and $Y_2$ may be the same as or different from each other, and represent hydrogen atom, alkyl group having 1 to 7 carbon atoms, aralkyl group having 1 to 7 carbon atoms, or aryl group having 1 to 7 carbon atoms. X represents alkylene group having 1 to 4 carbon atoms. $W_1$ and $W_2$ may be the same as or different from each other, and represent ester group, ether group, amino group, amide group, carbonate group, acid anhydride group, urethane group, urea group, or atomic bonding.

General Formula (2)

In General Formula (2), n represents a natural number. Z represents hydrogen atom, methyl group, phenyl group, or —O—$R_1$. $R_1$ represents straight-chain or branched alkyl group having 1 to 4 carbon atoms.

The present invention can solve the conventional problems described above, achieve the object described above, and provide a resin composition that has a suppressed voltage dependency, and of which electric resistance in the intermediate resistance range (from $10^6 \Omega/\square$ to $10^{11} \Omega/\square$ in terms of surface resistivity) is easy to adjust even when containing an electro-conductive agent in a small additive amount, that has excellent tensile elongation at break, and from which a desired amount of reflection light can be obtained.

Figure 1A:
FIG. 1A is an exemplary diagram showing a molecular weight distribution graph, including one molecular weight distribution peak.

DETAILED DESCRIPTION OF THE INVENTION (Resin Composition)

A resin composition of the present invention contains at least polyolefin, an electro-conductive agent, and a compound represented by General Formula (1) below, and further contains other components such as an ion conductive agent according to necessity.

The content of the polyolefin in the resin composition is from 50% by mass to 90% by mass.

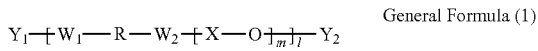

General Formula (1)

In General Formula (1), l and m represent natural numbers, R represents straight-chain or branched alkylene group having 20 or more carbon atoms, a divalent group having a number average molecular weight of 1,000 or greater and represented by General Formula (2) below, or a divalent group derived from acrylic polymer, polyurethane, or polyamide and having a number average molecular weight of 1,000 or greater when m is 20 or greater, or R represents a divalent group having a number average molecular weight of 1,000 or greater and represented by General Formula (2) below when m is 19 or less. $Y_1$ and $Y_2$ may be the same as or different from each other, and represent hydrogen atom, alkyl group having 1 to 7 carbon atoms, aralkyl group having 1 to 7 carbon atoms, or aryl group having 1 to 7 carbon atoms. X represents alkylene group having 1 to 4 carbon atoms. $W_1$ and $W_2$ may be the same as or different from each other, and represent ester group, ether group, amino group, amide group, carbonate group, acid anhydride group, urethane group, urea group, or atomic bonding.

General Formula (2)

In General Formula (2), n represents a natural number. Z represents hydrogen atom, methyl group, phenyl group, or $-O-R_1$. $R_1$ represents straight-chain or branched alkyl group having 1 to 4 carbon atoms.

<Polyolefin>

The polyolefin is not particularly limited and may be appropriately selected according to the purpose. Examples include: homopolymers containing ethylene, propylene, 1-butene, 1-pentene, 1-hexene, 1-heptene, 1-octene, 1-nonene, 1-decene, 1-dodecene, 4-methyl-1-pentene, 4-methyl-1-hexene, or the like as the monomer component; and copolymers of these monomer components.

One of these may be used alone, or two or more of these may be used in combination. These may be straight-chained or branched-chained.

Examples of the homopolymers include ethylene homopolymer, propylene homopolymer, 1-butene homopolymer, 1-hexene homopolymer, and 4-ethyl-1-pentene homopolymer.

Examples of the copolymers include ethylene-propylene copolymer, ethylene-1-butene copolymer, ethylene-1-hexene copolymer, ethylene-4-methyl-1-pentene copolymer, ethylene-1-octene copolymer, ethylene-propylene-1-butenecopolymer, ethylene-1-butene-1-hexene copolymer, ethylene-1-butene-1-octene copolymer, propylene-1-butene copolymer, and propylene-1-butene-1-hexene copolymer.

Commercially-available products can be used as the homopolymer. Examples of commercially-available products include: NOVATEC PP EA9 (MFR: 0.5 g/10 min) (manufactured by Japan Polypropylene Corporation) as polypropylene; product No. 427896 (Mn: 50,000, MFR: 35 g/10 min), product No. 452149 (Mn: 75,000, MFR: 2.2 g/10 min), and product No. 427861 (Mn: 97,000, MFR: 4 g/10 min) (all manufactured by Sigma-Aldrich Co., LLC.) as polypropylene; and POLYPROPYLENE F109V (MFR: 30 g/10 min), POLYPROPYLENE F-704NP (MFR: 7 g/10 min), PRIME POLYPRO E111G (MFR: 0.5 g/min), and HI-ZEX (MFR: 0.66 g/min) (all manufactured by Prime Polymer Co., Ltd.).

Commercially-available products can be used as the copolymer. Examples of commercially-available products include: product No. 429139 (MFR: 30 g/min) (Sigma-Aldrich Co., LLC.) as polyethylene-polypropylene copolymer; and PROPYLENE RANDOM POLYMER F329RA (MFR: 25 g/10 min), PROPYLENE RANDOM POLYMER F-744NP (MFR: 7 g/10 min), and PRIME POLYPRO B221WA (MFR: 0.5 g/min) (all manufactured by Prime Polymer Co., Ltd.).

The content of the polyolefin in the resin composition is not particularly limited and may be appropriately selected according to the purpose as long as it is from 50% by mass to 90% by mass. However, it is preferably from 60% by mass to 80% by mass, and more preferably from 65% by mass to 75% by mass.

When the content is less than 50% by mass, the mechanical strength of the polyolefin may not be expressed. When the content is greater than 90% by mass, the range in which the resistivity can be controlled may be narrowed. Meanwhile, it is advantageous if the content is from 65% by mass to 75% by mass, in terms of tensile elongation at break and resistance control.

The polyolefin preferably has 2 or more peaks in the molecular weight distribution measured by gel permeation chromatography (GPC).

Here, a peak of a molecular weight distribution means peak top molecular weight (Mp).

The method for measuring the molecular weight distribution of polyolefin by gel permeation chromatography (GPC) may be the method using the following conditions, for example.

Figure 1B:
FIG. 1B is an exemplary diagram showing a molecular weight distribution graph, including two molecular weight distribution peaks.

The method for analyzing peak of a molecular weight distribution may be an analyzing method using a GPC software program (e.g., HLC-8228GPC manufactured by Tosoh Corporation). This allows for determining whether a graph representing a molecular weight distribution includes one molecular weight distribution peak (FIG. 1A), two molecular weight distribution peaks (FIG. 1B), or more.

Preferable examples of an elution solvent for GPC measurement include NMP (N-methylpyrolidone), and DMAc (dimethylacetamide), —GPC Measurement Conditions—

Column: Shodex GPC KF-806L (8.0 mmID×300 mm, manufactured by Showa Denko K.K.)

Elution: NMP or DMAc

Flow rate: 1.0 mL/min

Detector: Shodex RI Column (manufactured by Showa Denko K.K.)

Temperature: 40° C.

Polyolefins having different molecular weight distributions may be used in combination in order to make two or more peaks present in the molecular weight distribution of the polyolefin.

There has conventionally been a problem that a resin composition has a small tensile elongation at break and is broken when it is shaped into a film or a seamless belt. When the molecular weight distribution includes one peak, it has been difficult to obtain a relationship between tensile strength and tensile elongation at break in a desired range. A resin composition having a large tensile strength has a small tensile elongation at break, and is hence hard and brittle. A resin composition having a small ensile strength has a large tensile elongation at break and can elongate, but has a problem that it easily deforms.

With the polyolefin molecular weight distribution including two or more peaks, the same kind of materials with different molecular weights can make an almost uniform material, which is preferable because a desired tensile strength and tensile elongation at break can be obtained, and a desired amount of reflection light can be obtained.

The polyolefin preferably contains the homopolymer and the copolymer.

It is preferable that the polyolefin contain the homopolymer and the copolymer, because this will make dispersion of the electro-conductive agent better, suppress voltage dependency, and improve the tensile elongation at break. The factor of improving the dispersion of the electro-conductive agent is considered to be change in the crystalline state attributed to the presence of the copolymer, although this is estimation.

The homopolymer is not particularly limited and may be appropriately selected according to the purpose. Examples thereof include polyethylene and polypropylene.

The copolymer is not particularly limited and may be appropriately selected according to the purpose. Examples thereof include copolymers that contain as a constituent unit, a copolymerization monomer such as ethylene and 1-butene. These copolymers may be random copolymers or block copolymers. However, random copolymers are preferable. The copolymer may be straight-chained or branched.

It is preferable that the mathematical formula (2) below be satisfied where (a) represents melt flowrate (MFR) of the homopolymer of the polyolefin (a), and (b) represents MFR of the copolymer of the polyolefin.

$$1 \leq |(a)-(b)| \leq 20 \quad \text{Mathematical Formula (2)}$$

It is preferable that the absolute value of the difference between MFR (a) of the homopolymer of the polyolefin and MFR (b) of the copolymer of the polyolefin be from 1 to 20, because a desired glossiness and a desired amount of reflection light can be obtained, and a su nt tensile elongation at break can also be obtained. On the other hand, when the absolute value is less than 1 or greater than 20, the homopolymer and the copolymer may be phase-separated as the case may be if they have been simply mixed, and it becomes likely for carbon black to aggregate, remain unmelted, or produce dot-shaped defects (lumps) due to phase separation, and it may not be able to obtain a sufficient tensile elongation at break.

Here, MFR of the polyolefin can be measured according to JIS K7210.

It is also preferable that the melting point of the homopolymer be higher than the melting point of the copolymer.

The polyolefin is preferably a thermoplastic fluorine resin in terms of flame retardancy. The fluorine resin is not particularly limited and may be appropriately selected according to the purpose. Examples thereof include polyvinylidene fluoride, vinylidene fluoride-tetrafluoroethylene copolymer, vinylidene fluoride-hexafluoropropylene copolymer, ethylene-tetrafluoroethylene copolymer (ETFE), polychlorotrifluoroethylene (PCTFE), tetrafluoroethylene-hexafluoropropylene copolymer (FEP), and tetrafluoroethylene-perfluoroalkylvinylether copolymer (PFA).

Examples of commercially-available products of the fluorine resin include polyvinylidene fluoride (KYNAR (Registered Trademark) 720 manufactured by Arkema K.K).

Among these, preferable as the homopolymer of the polyolefin is polyvinylidene fluoride, and preferable as the copolymer of the polyolefin is a copolymer, of which monomer components are vinylidene fluoride (VDF) and hexafluoropropylene (HFP). Examples of commercially-available products of such a copolymer include polyvinylidene fluoride copolymer (KYNARFLEX (Registered Trademark) 2750 manufactured by Arkema K.K.).

Polyolefins such as polyethylene and polypropylene have a poor flame retardancy, and it is difficult to use them as main components at places where a voltage is used. As compared with this, use of a fluorine resin such as polyvinylidene fluoride (PVDF) can impart flame retardancy to the polyolefin.

Further, use of a copolymer, of which monomer components are vinylidene fluoride (VDF) and hexafluoropropylene (HFP), can improve dispersion of the electro-conductive agent.

<Electro-Conductive Agent>

The electro-conductive agent is not particularly limited and may be appropriately selected according to the purpose. Examples thereof include carbon black, carbon nanotube, fullerene, and metal oxide.

The metal oxide is not particularly limited and may be appropriately selected according to the purpose. Examples include: titanium oxide; zinc oxide; tin oxide; indium tin oxide; and oxides of metals such as copper.

The carbon black is not particularly limited and may be appropriately selected according to the purpose. Examples thereof include TOKABLACK #4300, #4400, #4500, #5500, etc. (manufactured by Tokai Carbon Co., Ltd., furnace black); PRINTEX L, etc. (manufactured by Evonik Degussa Co., Ltd., furnace black): RAVEN 7000, 5750, 5250, 50000 ULTRA III, 5000ULTRA, CONDUCTEX SC ULTRA, CONDUCTEX 975 ULTRA, PUER BLACK 100, PUER BLACK 115, PUER BLACK 205, etc. (manufactured by Columbian Chemicals Company, furnace black); #2350, #2400B, #2600B, #3050B, #3030B, #3230B, #335013, #3400B, #5400B, etc. (manufactured by Mitsubishi Chemical Corporation, furnace black); MONARCH 1400, 1300, 900, VULCAN XC-72R, BLACK PEARLS 2000, etc. (manufactured by Cabot Corporation, furnace black); ENSACO 250G, ENSACO 260G, ENSACO 350G, and SUPER P-LI (manufactured by Timcal Graphite & Carbon); KETJEN BLACK EC-300J, and EC-600JD (manufactured by Ketjenblack International Co.); DENKA BLACK, DENKA BLACK HS-100, FX-35, etc (manufactured by Denki Kagaku Kogyo Kabushiki Kaisha, acethylene black); and others.

The content of the electro-conductive agent in the resin composition is not particularly limited and may be appropriately selected according to the purpose. However, it is preferably from 1% by mass to 20% by mass, and more preferably from 6% by mass to 10% by mass.

When the content is less than 1% by mass, the resistivity of the resin composition may be excessively high. When the content is greater than 20% by mass, the resin composition may be easily broken. On the other hand, the content of from 6% by mass to 10% by mass is even more advantageous, in terms of both of resistivity control and breaking suppression. Owing to the mutual effect between the compound represented by General Formula (1) above and the electro-conductive agent, the resin composition of the present invention needs not contain the electro-conductive agent in a large amount to lower the resistance, and the electric resistance of the resin composition in the intermediate resistance range is easily adjustable desirably even when the content of the electro-conductive agent is small. Since the content of the electro-conductive agent can be saved, there is an advantage that ketjen black or carbon nanotube can be used as the electro-conductive agent.

<Compound Represented by General Formula (1)>

The compound is a compound represented by General Formula (1).

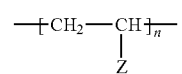

General Formula (1)

In General Formula (1), l and m represent natural numbers. R represents straight-chain or branched alkylene group having 20 or more carbon atoms, a divalent group having a number average molecular weight of 1,000 or greater and represented by General Formula (2) below, or a divalent group derived from acrylic polymer, polyurethane, or polyamide and having a number average molecular weight of 1,000 or greater when m is 20 or greater, or R represents a divalent group having a number average molecular weight of 1,000 or greater and represented by General Formula (2) below when m is 19 or less. $Y_1$ and $Y_2$ may be the same as or different from each other, and represent hydrogen atom, alkyl group having 1 to 7 carbon atoms, aralkyl group having 1 to 7 carbon atoms, or aryl group having 1 to 7 carbon atoms. X represents alkylene group having 1 to 4 carbon atoms. $W_1$ and $W_2$ may be the same as or different from each other, and represent ester group, ether group, amino group, amide group, carbonate group, acid anhydride group, urethane group, urea group, or atomic bonding (single bond).

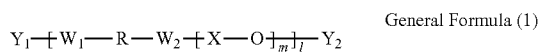

General Formula (2)

In General Formula (2), n represents a natural number. Z represents hydrogen atom, ethyl group, phenyl group, or —O—$R_1$. $R_1$ represents straight-chain or branched alkyl group having 1 to 4 carbon atoms.

When the substituent group R is a straight-chain or branched alkylene group containing 20 or more carbon atoms or a group having a number average molecular weight of 1,000 or greater and represented by General Formula (2) above, examples of —$W_1$—R—$W_2$— include a divalent group derived from terminal-modified polyolefin, where the modifying group at the terminal correspond to $W_1$ and $W_2$.

The terminal-modified polyolefin is not particularly limited and may be appropriately selected according to the purpose. Examples thereof include: polyolefin for which a hydroxyl group is substituted at the terminal as represented by the general formula below, such as polyhydroxy polyolefin oligomer (e.g., "POLYTAIL" manufactured by Mitsubishi Chemical Corporation); and acid-modified polyolefin obtained by modifying a terminal of polyolefin with maleic anhydride (e.g., acid-modified polypropylene and acid-modified polyethylene).

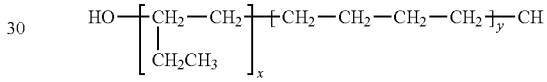

The method for synthesizing the terminal-modified polyolefin is not particularly limited and may be appropriately selected according to the purpose. Examples thereof include a thermal degradation method, and a method using a radical initiator such as hydrogen peroxide. The methods described in JP-A Nos-2009-114435, 01-236214, 61-276808, and 09-278956 can be used.

The acrylic polymer is not particularly limited and may be appropriately selected according to the purpose. Examples thereof include: (meth)acrylic acid aliphatic hydrocarbon (e.g., alkyl containing 1 to 18 carbon atoms) ester, such as (meth)acrylic acid, methyl (meth)acrylate, ethyl (meth)acrylate, n-propyl (meth)acrylate, n-hutyl (meth)acrylate, isobutyl (meth)acrylate, n-pentyl (meth)acrylate, n-hexyl at (meth)acrylate, n-heptyl (meth)acrylate, n-octyl (meth)acrylate, 2-ethylhexyl (meth)acrylate, nonyl (meth)acrylate, decyl (meth)acrylate, dodecyl (meth)acrylate, and stearyl (meth)acrylate; (meth)acrylic acid alicyclic hydrocarbon ester such as cyclohexyl (meth)acrylate and isobornyl (meth)acrylate; (meth)acrylic acid aralkyl ester such as benzil (meth)acrylate; acrylic acid aromatic hydrocarbon ester such as phenyl (meth)acrylate and toluyl (meth)acrylate; (meth)acrylic acid ester of ether oxygen-containing functional group-containing alcohol, such as 2-methoxyethyl (meth)acrylate and 3-methoxybutyl (meth)acrylate; and (meth)acrylic acid alkyl fluoride ester, such as trifluoromethyl methyl (meth)acrylate, 2-trifluoromethyl ethyl (meth)acrylate, 2-perfluoroethyl ethyl (meth)acrylate, 2-perfluoroethyl-2-perfluorobutyl ethyl (meth)acrylate, 2-perfluoroethyl (meth)acrylate, perfluoromethyl (meth)acrylate, diperfluoromethyl methyl (meth)acrylate, 2-perfluoromethyl-2-perfluoroethyl methyl (meth)acrylate 2-perfluorohexyl ethyl (meth)acrylate, 2-perfluorodecyl ethyl (meth)acrylate, and 2-perfluorohexadecyl ethyl (meth)acrylate.

The description "(meth)acrylate" means both of acrylate and methacrylate.

It is preferable that R in General Formula (1) above be a divalent group derived from acrylic polymer having a number average molecular weight of 1,000 or greater. This enables the resin composition and a shaped product thereof to have a preferable appearance with glossiness on the surface, and to stably reflect a desired amount of light when irradiated with light.

Note that "a divalent group derived from acrylic polymer" means a divalent group obtained by eliminating one hydrogen atom from each terminal of the acrylic polymer.

The polyurethane can be obtained from an addition reaction between an isocyanate group and a compound containing active hydrogen such as hydroxyl group.

The polyurethane is not particularly limited and may be appropriately selected according to the purpose. Examples hereof include polyurethane resulting from polymerization between polyhydroxy polyolefin oligomer (e.g., "POLYTAIL" manufactured by Mitsubishi Chemical. Corporation) and diisocyanate (e.g., hexamethylenediisocyanate tolylenediisocyanate, and diphenylmethanediisocyanate) by urethane bond.

Note that "a divalent group derived from polyurethane" means a divalent group obtained by eliminating the respective terminal groups (hydroxyl group and isocyanate group) from the polyurethane.

The polyamide can be obtained from: polymerization condensation between dicarboxylic acid (e.g., terephthalic acid, isophthalic acid, oxalic acid, adipic acid, sebacic acid, and 1,4-cyclohexyldicarboxylic acid) and diamine (e.g., ethylenediamine, pentamethylenediamine, hexamethylenediamine, decamethylenediamine, 1,4-cyclohexyldiamine, and m-xylylenediamine); polymerization of cyclic lactam (e.g., caprolactam and laurolactam); polycondensation of aminocarboxylic acid (e.g., aminocarboxylic acid, aminononanoic acid, and aminoundecanoic acid); copolymerization among the cyclic lactam, dicarboxylic acid, and diamine; or the like.

Note that "a divalent group derived from polyamide" means a divalent group obtained by eliminating one hydrogen atom from each terminal of polyamide.

The polyamide is not particularly limited and may be appropriately selected according to the purpose. Examples thereof include 6 nylon, 66 nylon, 610 nylon, 612 nylon, 11 nylon, 12 nylon, 66/610 copolymeric nylon, and 6/66 copolymeric nylon. Among these, 6 nylon is preferable in terms of breaking suppression and shapability of the resin composition.

It is preferable that R in General Formula (1) above be a divalent group derived from polyamide and having a number average molecular weight of 1,000 or greater. This can improve voltage dependency of the resistance, and can suppress occurrence of resistance variation along a weld line of a molded product of the resin composition, such as a seamless belt.

The substituent group X is not particularly limited and may be appropriately selected according to the purpose as long as it is an alkylene group containing 1 to 4 carbon atoms. However, it is preferably an alkylene group containing 2 carbon atoms, in terms of resistivity and breaking suppression of the resin composition.

A polymer (polyethyelene oxide) that contains the above —X—O— as repeating units is not particularly limited and may be appropriately selected according to the purpose. A commercially-available product may be used. Examples of commercially-available products include product No. 202444 (Mn: 3,350), product No, 81260 (Mn: 6,000), etc. (all manufactured by Sigma-Aldrich Co., LLC.) as polyethylene glycol.

The substituent groups $Y_1$ and $Y_2$ may be the same as or different from each other. They are not particularly limited and may be appropriately selected according to the purpose, as long as they are hydrogen atom, alkyl group containing 1 to 7 carbon atoms, aralkyl group containing 1 to 7 carbon atoms, or aryl group containing 1 to 7 carbon atoms. However, they are preferably hydrogen atom, in terms of breaking suppression of the resin composition.

The numbers represented by l and m are not particularly limited and may be appropriately selected according to the purpose, as long as they are natural numbers.

In the resin composition, the combination of substituent groups in the compound represented by General Formula (1) above is not particularly limited and may be appropriately selected according to the purpose. However, the following combinations (1) to (4) are preferable.

(1) A combination in which R is group having a number average molecular weight of 1,000 or greater and represented by General Formula (2), Z in General Formula (2) is methyl group, $W_1$ and $W_2$ are acid anhydride group, X is alkylene group having 2 carbon atoms, and $Y_1$ and $Y_2$ are hydrogen atom.

(2) A combination in which R is alkyl group having 20 or more carbon atoms, one of $W_1$ and $W_2$ is ether group and the other is atomic bonding, X is alkylene group having 2 carbon atoms, and $Y_1$ and $Y_2$ are hydrogen atom.

(3) A combination in which R is divalent group derived from polyurethane and having a number average molecular weight of 1,000 or greater, $W_1$ and $W_2$ are urethane group, X is alkylene group having 2 carbon atoms, and $Y_1$ and $Y_2$ are hydrogen atom.

(4) A combination in which R is divalent group derived from acrylic polymer and having a number average molecular weight of 1,000 or greater, $W_1$ and $W_2$ are atomic bonding, X is alkylene group having 2 carbon atoms, and $Y_1$ and $Y_2$ are hydrogen atom.

The content of the compound represented by General Formula (1) in the resin composition is not particularly limited and may be appropriately selected according to the purpose. However, it is preferably from 1% by mass to 10% by mass, and more preferably from 2% by mass to 5% by mass.

When the content is less than 1% by mass, the resistivity of the resin composition may have a large in-plane variation. When the content is greater than 10% by mass, the mechanical strength and the flame retardancy of the resin composition may degrade. On the other hand, it is advantageous if the content is from 2% by mass to 5% by mass, because the in-plane variation of the resistivity of the resin composition can be suppressed, and besides, the flame retardancy of the resin composition can be satisfied at the same time.

<Other Components>

The other components are not particular limited and may be appropriately selected according to the purpose. Examples thereof include ion conductive agent, nucleophile, antioxidant, radical scavenger, ultraviolet light stabilizer, and ultraviolet absorber.

It is also possible to add lithium trifluoromethanesulfonate ($CF_3SO_3Li$) in order to promote electro-conductivity.

The ion conductive agent is not particularly limited and may be appropriately selected according to the purpose. Examples thereof include alkali metal salt, surfactant, and ionic liquid.

The content of the ion conductive agent in the resin composition is not particularly limited and may be appropriately selected according to the purpose. However, it is preferably from 0.01% by mass to 3% by mass, and more preferably from 0.05% by mass to 1% by mass.

Even if the content of the ion conductive agent is small, addition of the compound represented by General Formula (1) above to the resin composition makes it possible to impart a desired surface resistivity in the intermediate resistance range to the resin composition. Addition thereof also snakes it possible to suppress bleed-out from being produced on the surface of a shaped product of the resin composition such as a belt, and to suppress the resistance value from being changed along with decreasing of the concentration of the ion conductive agent due to electricity application.

Examples of the nucleophile include organic nucleophile and inorganic nucleophile.

Examples of the organic nucleophile include: metal salts of organic acids (e.g., metal salts such as magnesium salt, calcium salt, sodium salt, aluminum salt, and titanium salt of benzoic acid, cyclohexanecarboxylic acid, diphenyl acetic acid, isonicotinic acid, adipic acid, sebacic acid, phthalic acid, benzenesulfonic acid, and glycolic acid; and amine salts of organic acids (e.g., amines derived from benzoic acid, phthalic acid, and adipic acid).

Examples of the inorganic nucleophile include particles of silica, alumina, and talc.

Preferable examples of the antioxidant, the radical scavenger, the ultraviolet light stabilizer, and the ultraviolet absorber include hindered phenol antioxidant, phosphorus-based antioxidant, sulfur-based antioxidant, phenol-based radical scavenger, hindered amine-based light stabilizer, benzotriazole-based compound, and benzophenone-based compound.

Two or more of these antioxidant, radical scavenger, ultraviolet light stabilizer, and ultraviolet absorber may be used in mixture.

Examples of the hindered phenol antioxidant include pentaerythritol-tetrakis(3-(3,5-di-t-butyl-4-hydroxyphenyl)prop a thiodiethylene-bis(3-(3,5-di-t-butyl-4-hydroxyphenyl)propionate), octadecyl-3-(3,5-di-t-butyl-4-hydroxyphenyl)propionate, N,N'-hexane-1,6-diylbis(3-(3,5-di-t-butyl-4-hydroxyphenyl)propionamide), diethyl((3,5-bis(1,1-dimethylethyl)-4-hydroxyphenyl)methyl)phosphate, 3,3',3",5,5',5"-hexa-t-butyl-a,a',a"-(mesitylene-2,4,6-triyl)tri-p-cresol, ethylenebis(oxyethylene)bis(3-(5-t-butyl-4-hydroxy-m-tolyl)propionate), hexamethylene-bis(3-(3,5-di-t-butyl-4-hydroxyphenyl)propionate), 1,3,5-tris(3,5-di-t-butyl-4-hydroxybenzyl)-1,3,5-triaz ne-2,4,6-(1H,3H,5H)-trione, 1,3,5-tris((4-t-butyl-3-hydroxy-2,6-xylyl)methyl)-1,3,5-triazine-2,4,6-(1H,3H,5H)-trione, 2,6-di-t-butyl-4-(4,6-bis(octylthio)-1,3,5-triazine-2-ylamino)phenol, and 3,9-bis(2-(3-(3-t-butyl-4-hydroxy-5-methylphenyl)propionyloxy)-1,1-dimethylethyl)-2,4,8,10-tetraoxaspiro(5,5)undecane.

Examples of the phosphorus-based antioxidant include tris (2,4-di-t-butylphenyl)phosphite, bis(2,4-bis(1,1-dimethylethyl)-6-methylphenyl)ethyl ester phosphite, tetrakis(2,4-di-t-butylphenyl)(1,1-biphenyl)-4,4'-diylbisphosphonite, bis(2,4-di-t-butylphenyl)pentaerythritol diphosphite, bis(2,6-di-t-butyl-4-methylphenyl)pentaerythritol diphosphite, bis(2,4-dicumylphenyl)pentaerythritol-diphosphite, tetrakis(2,4-t-butylphenyl) (1,1-biphenyl)-4,4'-diylbisphosphonite and di-t-butyl-m-cresyl-phosphonite.

Examples of the hindered amine-based light stabilizer include poly((6-morpholino-s-triazine-2,4-diyl)((2,2,6,6-tetramethyl-4-piperidyl) mino)hexamethylene((2,2,6,6-tetramethyl-4-piperidyl)imino)) (molecular weight of 1,600), poly ((6-(1,1,3,3,-tetramethylbutyl)amino-1,3,5-triazine-2,4-diyl)((2,2,6,6-tetramethyl-4-piperidyl)hexamethylene((2,2,6,6-tetramethyl-4-piperidyl)imino)) (number average molecular weight of from 2,000 to 3,100), a polycondensate of dibutylamine-1,3,5-triazine-N,N'-bis(2,2,6,6-tetramethyl-4-piperidyl)-1,6-hexamethylenediamine and N-(2,2,6,6-tetramethyl-4-piperidyl)butylamine (number average molecular weight of from 2,600 to 3,400), N,N'-bis(3-aminopropyl) ethylenediamine-2,4-bis(N-butyl-N-(1,2,2,6,6-pentamethyl-4-piperidyl)amino)-6-chloro-1,3,5-triaz ne condensate (number average molecular weight of 2,000 or greater), and dimethyl-1-(2-hydroxyethyl)-4-hydroxy-2,2,6,6-tetramethylpiperidine succinate condensate (number average molecular weight of from 3,100 to 1,000).

Examples of the ultraviolet absorber include benzotriazolo, benzophenone, triazine, and benzoate.

(Seamless Belt)

The seamless belt of the present invention is made of the resin composition of the present invention.

The seamless belt is preferably a belt for an image forming apparatus that is rotatable by being tensed between a plurality of roller members, and preferably a intermediate transfer belt of an intermediate transfer belt-type electrophotography apparatus [which is an apparatus configured to perform first, transfer of sequentially overlaying a plurality of color toner-developed images sequentially formed on a so-called image bearing member (e.g., a photoconductor drum) on an intermediate transfer belt and then perform second transfer of simultaneously transferring the firstly transferred images onto a target recording medium].

The resistance value of the seamless belt is not particularly limited and may be appropriately selected according to the purpose. However, it is preferably from $1\times10^5\Omega\cdot cm$ to $1\times10^{10}\Omega\cdot cm$ in terms of volume resistance, and from $1\times10^5\Omega/\square$ to $1\times10^6\Omega/\square$ in terms of surface resistance, when the seamless belt is used as a seamless belt to be suitably mountable as the intermediate transfer belt. It is also preferable that volume resistivity≤surface resistivity be satisfied.

When the volume resistivity and the surface resistivity are less than the lower limit values described above, the seamless belt may have transfer failures depending on image pattern, sheet type, and sheet size, or may have reduction in the second transfer efficiency. When the volume resistivity and the surface resistivity are greater than the upper limit values described above, charges induced to the belt by an applied transfer bias may not be eliminated to thereby influence image qualities such as image memory. Furthermore, when volume resistivity>surface resistivity, image edges may be blurred, and sharp images may not be obtained.

[Method for Manufacturing Seamless Belt]

The method for manufacturing the seamless belt is not particularly limited and may be appropriately selected according to the purpose. Examples thereof include a method of melt-kneading the materials of the resin composition and shaping the resin composition.

The melt-kneading method is not particularly limited and may be appropriately selected according to the purpose. Examples thereof include a method of kneading the materials of the resin composition containing at least a polyolefin-based resin, an electro-conductive agent, and a compound represented by General Formula (1) above while heating them, to thereby disperse the electro-conductive agent. The heating temperature is preferably equal to or higher than the glass transition temperature of the resin (e.g., from 160° C. to 220° C.), and it is more preferable to knead the materials at a temperature at which they may be melted sufficiently. When melt-kneading an electro-conductive agent in a thermoplastic resin, it is common to apply a high shearing force to the electro-conductive agent in its aggregated state, and disrupt and fracture it into fine pieces to uniformly disperse the electro-conductive agent in the molten resin. Examples of the kneader for producing a high shearing force include a kneader utilizing a millstone mechanism, a uniaxial melt-kneader, and a unidirectional biaxial extruder equipped with screw elements into which a kneading disk that can apply a high shearing force is introduced.

The shaping method is not particularly limited and may be appropriately selected according to the purpose. Preferable examples thereof include injection forming, injection compression molding, injection press forming or injection mold forming, compression forming, and transfer molding. Among these, injection forming methods such as injection press forming and injection mold forming are preferable because they are excellent in productivity, and flash flow compression molding is particularly preferable.

The mold used for the shaping is not particularly limited and may be appropriately selected according to the purpose. Examples thereof include a cylindrical mold, and a coat hanger type mold.

[($\Delta H2-\Delta H1$)×100/$\Delta H1$]

A value "($\Delta H2-\Delta H1$)×100/$\Delta H1$" of the resin composition and a shaped product of the resin composition such as the seamless belt is not particularly limited and may be appropriately selected, where $\Delta H1$ is an amount of heat of melting $\Delta H$ (J/g) at the first temperature raising of differential scanning calorimetry (DSC), and $\Delta H2$ is an amount of heat of melting $\Delta H$ (J/g) at the second temperature raising of the DSC. However, the value preferably satisfies the mathematical formula (1) below.

$$1 \leq (\Delta H2-\Delta H) \times 100/\Delta H1 \leq 30 \quad \text{Mathematical Formula (1)}$$

When the value is less than 1, the resin composition and a shaped product thereof are considered to have crystallized to the same state as when they are crystallized by being cooled at 10° C./min, and when the crystallization has progressed, the electro-conductive agent may not have been dispersed well, resulting in unstable resistivity. When the value is greater than 30, the resin that should have crystallized is present in an amorphous state, or the resin composition will very easily crystallize on the conditions of the second temperature raising, which means that the resin composition lacks stability and may easily undergo creep deformation when it is stored under conditions such as a temperature of 50° C. and a relative humidity of 90% RH for a long time or under a load for a long time. On the other hand, it is advantageous if the value satisfies the mathematical formula (1) above, because the dispersibility of the electro-conductive agent and the voltage dependency can be improved to make the resistivity stable, a shaped product with a preferable surface property can be obtained, and a desired amount of reflection light can be obtained upon light irradiation.

[Measurement of $\Delta H1$ and $\Delta H2$]

The amount of heat of melting $\Delta H1$ (J/g) at the first temperature raising and the amount of heat of melting $\Delta H2$ (J/g) at the second temperature raising can be measured under the following DSC measurement conditions.

—DSC Measurement Conditions—

Temperature profile: room temperature→−30° C.→250° C.→−30° C.→250° C.→End

Temperature raising rate: 10° C./min

Atmosphere: nitrogen gas (20 mL/min)

Instrument: DSC6200 manufactured by Seiko Instruments, Inc.

Amount of sample: 5.5 mg±0.5 mg

First temperature raising: the first raising from −30° C. to 250° C.

Second temperature raising: the second raising from −30° C. to 250° C.

Amounts of heat of melting at from 140° C. to 200° C. are measured as the amounts of heat of melting $\Delta H1$ and $\Delta H2$ (J/g).

The amounts of heat of melting $\Delta H1$ and $\Delta H2$ can be obtained by DSC measurement of the resin composition and a shaped product of the resin composition such as the seamless belt.

Figure 2A:
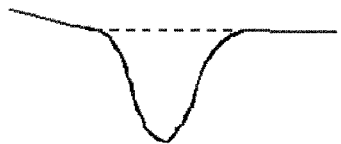
FIG. 2A is an exemplary diagram explaining a method for calculating an amount of heat of melting ΔH.
Figure 2B:
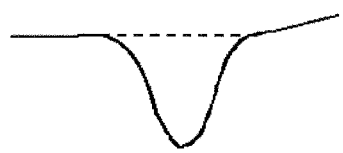
FIG. 2B is an exemplary diagram explaining a method for calculating an amount of heat of melting ΔH.
Figure 2C:
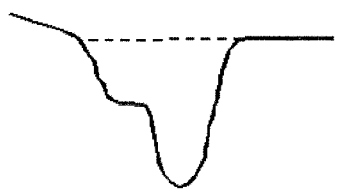
FIG. 2C is an exemplary diagram explaining a method for calculating an amount of heat of melting ΔH.

The method for calculating an amount of heat of melting $\Delta H$ will be explained with reference to FIGS. 2A to 2C. FIGS. 2A to 2C represent temperature on the horizontal axis and DSC (μW) on the vertical axis.

For the calculation of $\Delta H$, when a DSC curve has a flat portion after an endothermic peak (FIG. 2A), the area of a region surrounded by an extended line (indicated with a broken line in the diagram) of the flat portion and by the DSC curve is calculated. When the DSC curve has a flat portion before an endothermic peak (FIG. 2B), an extended line (indicated with a broken line in the diagram) is drawn from the flat portion before the endothermic peak, and the area of the region surrounded by the extended line and the DSC curve is calculated as $\Delta H$. Also when an endothermic peak has a shoulder (FIG. 2C), the amount of heat of melting is calculated in the same manner as FIGS. 2A and 2B. A calculation method of DSC6200 (manufactured by Seiko Instruments, Inc.) is used as the calculation method.

In order to detect toner concentration and position information, an image forming apparatus is typically provided with a toner concentration sensor configured to irradiate the surface of the intermediate transfer belt with light and measure the amount of light to be reflected. The toner concentration sensor detects toner concentration and position information based on a difference between the reflectivity of the bare surface of the belt and an amount of light reflected from the belt when toner is present on the belt. Based on the obtained information, a developing bias, a charging bias, or a first transfer bias is appropriately applied according to various algorithms. When the amount of light reflected from the bare surface of the intermediate transfer belt that is measured by the toner concentration sensor is non-uniform, precise information cannot be obtained with an error included in the toner concentration and position information.

Therefore, it is important that a desired amount of reflection light be obtained when the seamless belt is irradiated with light.

"Degree of glossiness" can be used as an indicator of whether a desired amount of reflection light can be obtained or not. The degree of glossiness can be obtained by, for example, measurement with a glossimeter (PG-II manufactured by Nippon Denshoku Industries, Co., Ltd.) at an incident angle of 60 degrees. When the degree of glossiness is 30 or greater, a desired amount of reflection light can be obtained.

Here, when the value of ($\Delta H2-\Delta H1$)×100/$\Delta H1$ is from 1 to 30, it is possible to provide a resin composition and a seamless belt from which a desired amount of reflection light can be obtained, that provide a belt bare surface from which an amount of reflection light can be measured at an improved precision, and that can provide excellent image qualities.

[Ratio of Standard Deviation σ to Reflection Output Voltage Vsg]

A value obtained by dividing standard deviation σ of reflection output voltage Vsg (V) of the seamless belt by Vsg is not particularly limited and may be appropriately selected according to the purpose. However, it is preferably 0.10 or less.

Here, "reflection output voltage" is an amount of reflection light measured by irradiating the surface of the seamless belt with light and converted to a voltage value. The reflection output voltage can be measured, for example, with a photosensor that can convert an amount of light to a voltage value. Average of the reflection output voltage can be expressed by an average of reflection output voltages from the whole circumference of the belt.

When the value ($\sigma$/Vsg) is 0.10 or less (i.e., when the standard deviation $\sigma$ is $\frac{1}{10}$ or less of the reflection output voltage Vsg), it is possible to provide a seamless belt that provides a belt bare surface from which an amount of reflection light can be measured at an improved precision, and that can provide excellent image qualities.

(Image Forming Apparatus and Image Forming Method)

An image forming apparatus of the present invention includes at least an electrostatic latent image bearing member (hereinafter may be referred to as "photoconductor"), an electrostatic latent image forming unit, a developing unit, and a transfer unit, and further includes other units according to necessity.

The image forming apparatus of the present invention includes the seamless belt of the present invention.

It is preferable that the seamless belt be an intermediate transfer belt, and the transfer unit include the intermediate transfer belt.

An image forming method of the present invention includes at least an electrostatic latent image forming step, a developing step, and a transfer step, and further includes other steps according to necessity.

The image forming method of the present invention uses the seamless belt of the present invention.

It is preferable that the seamless belt be an intermediate transfer belt, and the transfer step be a step using the intermediate transfer belt.

The image forming method can be preferably performed by the image forming apparatus. The electrostatic latent image forming step can be preferably performed by the electrostatic latent image forming unit. The developing step can be preferably performed by the developing unit. The other steps can be preferably performed by the other units.

<Electrostatic Latent Image Bearing Member>

The material, structure, and size of the electrostatic latent image bearing member are not particularly limited and may be appropriately selected from publicly-known designs. In terms of material, examples thereof include inorganic photoconductors made of amorphous silicon, selenium, etc., and organic photoconductors made of polysilane, phthalopolymethine, etc. Among these, amorphous silicon is preferable because it has a long life.

Examples of photoconductors made of the amorphous silicone include those manufactured by heating a support member to 50° C. to 400° C. and forming a photoconductive layer made of a-Si on the support member by vacuum vapor deposition, sputtering, ion plating, thermal CVD (Chemical Vapor Deposition), optical CVD, plasma CVD, or the like. Among these, plasma CVD, i.e., a method of decomposing a material gas by a direct current or by a high-frequency or microwave glow discharge and depositing an a-Si film on the support member is preferable.

The shape of the electrostatic latent image bearing member is not particularly limited and may be appropriately selected according to the purpose. However, it is preferably cylindrical. The outer diameter of the electrostatic latent image bearing member having the cylindrical shape is not particularly limited and may be appropriately selected according to the purpose. However, it is preferably from 3 mm to 100 mm, more preferably from 5 mm to 50 mm, and particularly preferably from 10 mm to 30 mm.

<Electrostatic Latent Image Forming Unit and Electrostatic Latent Image Forming Step>

The electrostatic latent image forming unit is not particularly limited and may be appropriately selected according to the purpose, as long as it is a unit configured to form an electrostatic latent image on the electrostatic latent image bearing member. Examples thereof include a unit that includes at least a charging member configured to electrically charge the surface of the electrostatic latent image bearing member and an exposing member configured to expose the surface of the electrostatic latent image bearing member to light imagewise.

The electrostatic latent image forming step is not particularly limited and may be appropriately selected according to the purpose, as long as it is a step of forming an electrostatic latent image on the electrostatic latent image bearing member. For example, the step can be performed by, for example, electrically charging the surface of the electrostatic latent image bearing member, and after this, exposing the surface of the electrostatic latent image bearing member to light imagewise, and can be performed by the electrostatic latent image forming unit.

—Charging Member and Charging—

The charging member is not particularly limited and may be appropriately selected according to the purpose. Examples thereof include publicly-known contact type charging devices including electro-conductive or semiconductive roller, brush, film, rubber blade, or the like, and contactless charging devices utilizing a corona discharge, such as a corotron, a scorotron, etc.

The charging can be performed by, for example, applying a voltage to the surface of the electrostatic latent image bearing member using the charging member.

The charging member may have any shape, such as a shape of a roller, a magnetic brush, and a fur brush, and a shape thereof can be selected according to the specifications and shape of the image forming apparatus.

When the magnetic brush is used as the charging member, the magnetic brush is constituted by, for example, a charging material such as particles of various kinds of ferrites such as Zn—Cu ferrite, a non-magnetic electro-conductive sleeve on which the charging material is supported, and a magnet roll embraced in the sleeve.

When the fur brush is used as the charging member, the fur may be, for example, a fur treated with carbon, copper sulfide, metal, or metal oxide to be electro-conductive. The fur may be wounded over or pasted to a cored bar treated with metal or the like to be electro-conductive, to thereby constitute the charging member.

The charging member is not limited to the contact type charging member, but use of a contact type charging member is preferable because this can constitute an image forming apparatus with reduced ozone emission from the charging member.

—Exposing Member and Exposing—

The exposing member is not particularly limited and may be appropriately selected according to the purpose, as long as it can expose the surface of the electrostatic latent image bearing member electrically charged by the charging member to light imagewise like the image to be formed. Examples thereof include various types of exposing members such as of a copier optical system, a rod lens array system, a laser optical system, and a liquid crystal shutter optical system.

A light source used for the exposing member is not particularly limited and may be appropriately selected according to the purpose. Examples thereof include light emitting materials of all types such as a fluorescent lamp, a tungsten lamp, a halogen lamp, a mercury lamp, a sodium vapor lamp, a light emitting diode (LED), a laser diode (LD), and electroluminescence (EL).

In order to enable irradiation with light having only a desired wavelength range, various types of filters such as a sharp cut filter, a band pass filter, a near infrared cut filter, a dichroic filter, an interference filter, and a color temperature conversion filter may be used.

The exposing can be performed by, for example, exposing the surface of the electrostatic latent image bearing member to light imagewise by using the exposing member.

In the present invention, it is also possible to employ a backlighting system for exposing the back surface of the electrostatic latent image bearing member to light imagewise.

<Developing Unit and Developing Step>

The developing unit is not particularly limited and may be appropriately selected according to the purpose, as long as it is a developing unit provided with a toner and configured to develop an electrostatic latent image formed on the electrostatic latent image bearing member to form a visible image.

The developing step is not particularly limited and may be appropriately selected according to the purpose, as long as it is a step of developing an electrostatic latent image formed on the electrostatic latent image bearing member with a toner to form a visible image, and can be performed by the developing unit.

The developing unit may be of a dry developing type or of a wet developing type. Further, it may be a single-color developing unit or a multi-color developing unit.

The developing unit is preferably a developing device including: a stirring device for frictionally stirring the toner to electrically charge the toner; a magnetic field generating unit secured inside; and a developer bearing member that is rotatable and bears a developer containing the toner on the surface thereof.

In the developing unit, for example, the toner and a carrier are mixed and stirred, and the toner is electrically charged due to the mixing and stirring friction and retained in a chain-like form on the surface of a rotating magnet roller to thereby form a magnetic brush. Since the magnet roller is provided near the electrostatic latent image bearing member, the toner constituting the magnetic brush formed on the surface of the magnet roller is partially removed to the surface of the electrostatic latent image bearing member by an electric attractive force. As a result, the electrostatic latent image is developed by the toner, and a visible image constituted by the toner is formed on the surface of the electrostatic latent image bearing member.

<Transfer Unit and Transfer Step>

The transfer unit is not particularly limited and may be appropriately selected according to the purpose, as long as it is a unit configured to transfer a visible image to a recording medium. However, it preferable includes a first transfer unit configured to transfer visible images to an intermediate transfer member to form a composite transfer image, and a second transfer unit configured to transfer the composite transfer image to a recording medium.

The transfer step is not particularly limited and may be appropriately selected according to the purpose, as long as it is a step of transferring a visible image to a recording medium. However, it is preferably a step using an intermediate transfer member to firstly transfer a visible image to the intermediate transfer member, and after this, secondly transfer the visible image to the recording medium.

The transfer step can be performed by, for example, electrically charging the photoconductor with a transfer charging device to transfer the visible image, and can be performed by the transfer unit.

Here, when an image to be secondly transferred to the recording medium is a color image made of plural colors of toners, the transfer unit may overlay the toners of the respective colors sequentially on the intermediate transfer member to form images on the intermediate transfer member, and the intermediate transfer member may secondly transfer the image on the intermediate transfer member simultaneously to the recording medium.

The intermediate transfer member is not particularly limited and may be appropriately selected from publicly-known transfer members according to the purpose. Preferable examples thereof include an intermediate transfer belt, and use of the seamless belt of the present invention as the intermediate transfer belt is preferable.

The transfer unit (the first transfer unit and the second transfer unit) preferably includes at least a transfer device configured to electrically charge a visible image formed on the photoconductor so as to be separated to the recording medium. Examples of the transfer device include a corona transfer device utilizing a corona discharge, a transfer belt, a transfer roller, a pressure transfer roller, and an adhesive transfer device.

The recording medium is representatively regular paper, but is not particularly limited and may be appropriately selected according to the purpose, as long as it can have a developed unfixed image transferred thereto. Examples thereof include PET base for OHP.

<Other Units and Other Steps>

Examples of the other units include a fixing unit, a cleaning unit, a charge eliminating unit, a recycling unit, and a control unit.

Examples of the other steps include a fixing step, a cleaning step, a charge eliminating step, a recycling step, and a control step.

—Fixing Unit and Fixing Step—

The fixing unit is not particularly limited and may be appropriately selected according to the purpose, as long as it is a unit configured to fix a transfer image transferred to the recording medium thereon. However, it is preferably a publicly-known heating/pressurizing member. Examples of the heating/pressurizing member include a combination of a heating roller and a pressurizing roller, and a combination of a heating roller, a pressurizing roller, and an endless belt.

The fixing step is not particularly limited and may be appropriately selected according to the purpose, as long as it is a step of fixing a visible image transferred to the recording medium thereon. For example, the fixing step may be performed for each color of toner when it is transferred to the recording medium, or the fixing step may be performed simultaneously for all colors of toners after they are overlaid.

The fixing step can be performed by the fixing member.

The heating/pressurizing member typically heat to preferably 80° C. to 200° C.

In the present invention, a publicly-known optical fixing device may be used together with the fixing member or instead of this according to the purpose.

A surface pressure in the fixing step is not particularly limited and may be appropriately selected according to the purpose. However, it is preferably from 10 $N/cm^2$ to 80 $N/cm^2$.

—Cleaning Unit and Cleaning Step—

The cleaning unit is not particularly limited and may be appropriately selected according to the purpose, as long as it is a unit capable of removing the toner remained on the photoconductor. Examples thereof include a magnetic brush cleaner, an electrostatic brush cleaner, a magnetic roller cleaner, a blade cleaner, a brush cleaner, and a web cleaner.

The cleaning step is not particularly limited and may be appropriately selected according to the purpose, as long as it is a step capable of removing the toner remained on the photoconductor, and can be performed by, for example, the cleaning unit.

—Charge Eliminating Unit and Charge Eliminating Step—

The charge eliminating unit is not particularly limited and may be appropriately selected according to the purpose, as long as it is a unit configured to apply a charge eliminating bias to the photoconductor to eliminate charges. Examples thereof include a charge eliminating lamp.

The charge eliminating step is not particularly limited and may be appropriately selected according to the purpose, as long as it is a step of applying a charge eliminating bias to the photoconductor to eliminate charges, and can be performed by, for example, the charge eliminating unit.

—Recycling Unit and Recycling Step—

The recycling unit is not particularly limited and may be appropriately selected according to the purpose, as long as it is a unit configured to recycle the toner removed in the cleaning step to the developing device. Examples thereof include a publicly-known conveying unit.

The recycling step is not particularly limited and may be appropriately selected according to the purpose, as long as it is a step of recycling the toner removed in the cleaning step to the developing device, and can be performed by, for example, the recycling unit.

—Control Unit and Control Step—

The control unit is not particularly limited and may be appropriately selected according to the purpose, as long as it is a unit capable of controlling the operations of the respective units. Examples thereof include devices such as a sequencer and a computer.

The control step is not particularly limited and may be appropriately selected according to the purpose, as long as it is a step capable of controlling the operations of the respective steps, and can be performed by, for example, the control unit.

An example of the image forming apparatus of the present invention will be explained with reference to FIG. 4 and FIG. 5.

Figure 4:
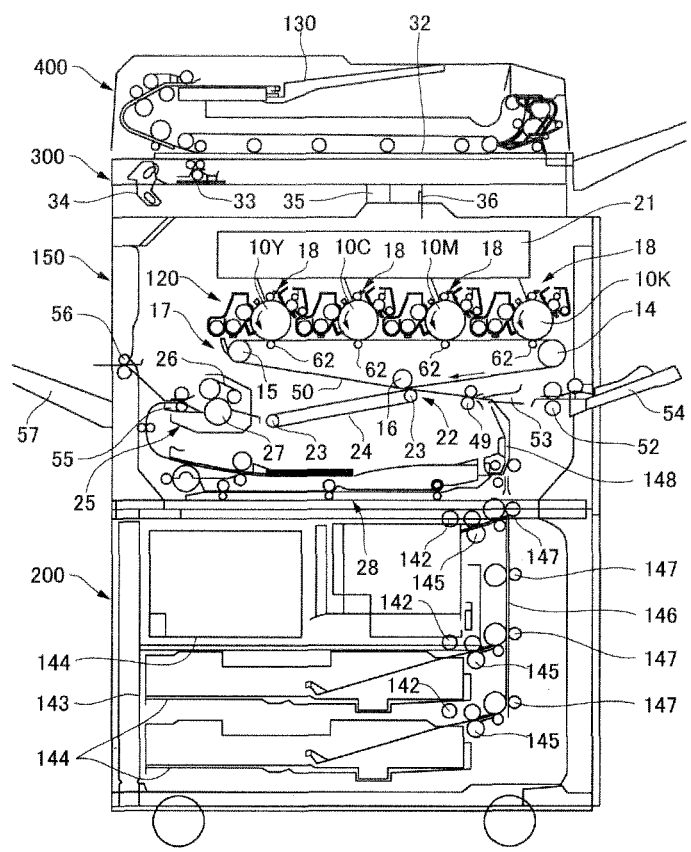
FIG. 4 is a schematic configuration diagram showing an example image forming apparatus of the present invention.
Figure 5:
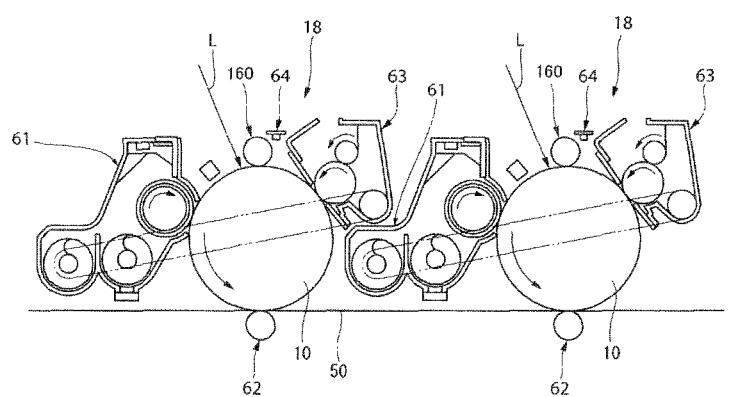
FIG. 5 is a diagram showing a portion of FIG. 4 in expansion.

An image forming apparatus shown in FIG. 4 includes a copier body 150, a sheet feeding table 200, a scanner 300, and an automatic document feeder (ADF) 400.

The copier body 150 includes an endless-belt-shaped intermediate transfer member 50 in the center thereof. The intermediate transfer member 50 is tensed over support rollers 14, 15, and 16 so as to be able to rotate clockwise in FIG. 4. An intermediate transfer member cleaning device 17 configured to remove toner remained on the intermediate transfer member 50 is provided near the support roller 15. The intermediate transfer member 50 tensed by the support rollers 14 and 15 is provided with a tandem developing device 120 including four image forming units 18 for yellow, cyan, magenta, and black, which are arranged side by side along the direction in which the intermediate transfer member 50 is conveyed, so as to face the intermediate transfer member. An exposing device 21 configured as the exposing member is provided near the tandem developing device 120. A second transfer device 22 is provided on a side of the intermediate transfer member 50 opposite to the side thereof on which the tandem developing device 120 is provided. In the second transfer device 22, a second transfer belt 24, which is an endless belt, is tensed over a pair of rollers 23, and a transfer sheet conveyed over the second transfer belt 24 and the intermediate transfer member 50 can contact each other. A fixing device 25 configured as the fixing unit is provided near the second transfer device 22. The fixing device 25 includes a fixing belt 26, which is an endless belt, and a pressurizing roller 27 pressed against the fixing belt 26.

In the tandem image forming apparatus, a sheet overturning device 28 configured to overturn a transfer sheet for images to be formed on both sides of the transfer sheet is provided near the second transfer device 22 and the fixing device 25.

Next, full-color image formation (color copying) with the tandem developing device 120 will be explained. First, a document is set on a document table 130 of the automatic document feeder 400, or the automatic document feeder 400 is opened to set the document on a contact glass 32 of the scanner 300, and then the automatic document feeder 400 is closed.

Upon a depression of a start switch (unillustrated), the scanner 300 is started after the document has been conveyed to the contact glass 32 when the document has been set on the automatic document feeder 400, or immediately after the depression of the start switch when the document has been set on the contact glass 32, and a first traveling member 33 and a second traveling member 34 are started to run. At this time, the document is irradiated with light from a light source by the first traveling member 33, and light reflected from the surface of the document is reflected on a mirror of the second traveling member 34 and received by a reading sensor 36 through an imaging lens 35. As a result, a color document (a color image) is read as image information of black, yellow, magenta, and cyan.

The image information of each of black, yellow, magenta, and cyan is transmitted to the corresponding image forming unit 18 (the black image forming unit, the yellow image forming unit, the magenta image forming unit, or the cyan image forming unit) in the tandem developing device 120, so that a toner image of each of black, yellow, magenta, and cyan may be formed. That is, as shown in FIG. 5, the image forming units 18 (i.e., the black image forming unit, the yellow image forming unit, the magenta image forming unit, and the cyan image forming unit) in the tandem developing device 120 each include: an electrostatic latent image bearing member 10 (a black electrostatic latent image bearing member 10K, a yellow electrostatic latent image bearing member 10Y, a magenta electrostatic latent image bearing member 10M, or a cyan electrostatic latent image bearing member 10C); a charging device 160 configured as the charging member for electrically charging the electrostatic latent image bearing member 10 uniformly; an exposing device configured to expose the electrostatic latent image bearing member to light (L in FIG. 5) imagewise like an image corresponding to the corresponding color image based on the corresponding color image information to thereby form an electrostatic latent image corresponding to the corresponding color image on the electrostatic latent image bearing member; a developing device 61 configured as the developing unit for developing the electrostatic latent image with the corresponding color toner (i.e., a black toner, a yellow toner, a magenta toner, or a cyan toner) to form a toner image of the corresponding color toner; a transfer charging device 62 configured to transfer the toner image to the intermediate transfer member 50; a cleaning device 63; and a charge eliminating device 64, and can form a single-color image of the corresponding color (i.e., a black image, a yellow image, a magenta image, or a cyan image) based on the corresponding color image information. The black image, the yellow image, the magenta image, and the cyan image formed in this way on the black electrostatic latent image bearing member 10K, the yellow electrostatic latent image bearing member 10Y, the magenta electrostatic latent image bearing member 10M, and the cyan electrostatic latent image bearing member 10C are transferred (firstly transferred) sequentially to the intermediate transfer member 50 that is being rotated and moved by the support rollers 14, 15, and 16. Then, the black image, the yellow image, the magenta image, and the cyan image are overlaid on the intermediate transfer member 50 to thereby form a composite color image (color transfer image).

In the sheet feeding table 200, one of sheet feeding rollers 142 is selectively rotated to bring forward sheets (recording sheets) from one of sheet feeding cassettes 144 provided multi-stages in a paper bank 143. The sheets are sent forth to a sheet feeding path 146 one by one separately through a separating roller 145, conveyed by a conveying roller 147 to be guided to a sheet feeding path 148 in the copier body 150, and stopped by being struck on a registration roller 49. Alternatively, a sheet feeding roller 142 is rotated to bring forward sheets (recording sheets) on a manual feeding tray 54, and the sheets are fed to a manual sheet feeding path 53 one by one separately through a separating roller 52, and likewise stopped by being struck on the registration roller 49. The registration roller 49 is generally used in an earthed state, but may be used in a biased state in order to remove paper dusts of the sheets. Then, the registration roller 49 is started to rotate so as to be in time for the composite color image synthesized on the intermediate transfer member 50, and the sheet (recording sheet) is sent forth to between the intermediate transfer member 50 and the second transfer device 22, so that the composite color image (color transfer image) may be transferred (secondly transferred) to the sheet (recording sheet) by the second transfer device 22. In this way, a color image is transferred and formed on the sheet (recording sheet). Any toner remained on the intermediate transfer member 50 after image transfer is cleaned away by the intermediate transfer member cleaning device 17.

The sheet (recording sheet) on which the color image has been transferred and formed is conveyed by the second transfer device 22 to the fixing device 25, so that the composite color image (color transfer image) may be fixed on the sheet (recording sheet) by heat and pressure. After this, the sheet (recording sheet) is switched by a switching claw 55 to a discharging roller 56 to be discharged and stacked on a sheet discharging tray 57. Alternatively, the recording sheet is switched by the switching claw 55 to the sheet overturning device 28 to be overturned and guided again to the transfer position, and after having an image recorded on the back surface thereof, discharged by the discharging roller 56 and stacked on the sheet discharging tray 57.

EXAMPLES

The present invention will now be explained more specifically based on Examples. However, the present invention is not to be limited to Examples below. Values indicated with "part" and "%" in Examples represent "part by mass" and "% by mass", unless otherwise specified.

Synthesis of Additives

Synthesis of Additive 1

Synthesis of Maleic Anhydride-Modified Polypropylene

Polypropylene (product No. 428116 manufactured by Sigma-Aldrich Co., LLC., number average molecular weight Mn: about 5,000) (800 parts), maleic anhydride (320 parts), and xylene (80 parts) were put in a glass container, and prepared as a uniform solution at 120° C. After this, benzoyl peroxide dissolved in a small amount of xylene (40 parts) was dropped down to the solution, and the resultant was reacted at 120° C. for 6 hours. After the reaction was completed, polymer segregation was performed in acetone, and the segregated polymer was filtrated and dried, to thereby obtain maleic anhydride-modified polypropylene (number average molecular weight Mn: 2,000). Powder of the maleic anhydride-modified polypropylene was pelletized with an extruder (LABOPLASTOMILL 2D25S manufactured by Toyo Seiki Seisaku-sho, Ltd., extruding condition: 130° C.).

Synthesis of Additive 1

The maleic anhydride-modified polypropylene obtained above (60 parts), polyethylene glycol (product No. 202444 manufactured by Sigma-Aldrich Co., LLC., Mn: 3,350) (33 parts), and zirconyl acetate (0.5 parts) were added to a stainless-made autoclave, and polymerized at 230° C. at a reduced pressure of 1 mmHg or lower for 4 hours, to thereby obtain a viscous polymer.

The obtained polymer was taken out in a strand form onto a belt and pelletized, to thereby obtain an additive 1, which was a compound represented by General Formula (1) in the form of a block polymer. The number average molecular weight Mn of the additive 1 was 27,000.

Synthesis of Additive 2

Polyhydroxy polyolefin oligomer (POLYTAIL (Registered Trademark) manufactured by Mitsubishi Chemical Corporation, Mn: 2,000, hydroxyl group value: 45 mg/g) (60 parts) as an alkyl chain containing 20 or more carbon atoms, polyethylene glycol (product No. 202444 manufactured by Sigma-Aldrich Co., LLC., Mn: 3,350) (33 parts), and zirconyl acetate (0.5 parts) were added to a stainless-made autoclave, and polymerized at 230° C. at a reduced pressure of 1 mmHg or lower for 4 hours, to thereby obtain a polymer.

The obtained polymer was taken out in a strand form onto a belt and pelletized, to thereby obtain an additive 2, which was a compound represented by General Formula (1) above in the form of a block polymer. The number average molecular weight Mn of the additive 2 was 26,500.

Synthesis of Additive 3

Toluene (200 parts), isopropyl alcohol (100 parts), and polyhydroxy polyolefin oligomer (POLYTAIL (Registered Trademark) manufactured by Mitsubishi Chemical Corporation, Mn: 2,000, hydroxyl group value 45 mg/g) (100 parts) were dissolved at 70° C. in a four-necked flask equipped with a stirrer, a thermometer, a Dimroth, and a nitrogen gas introducing pipe. Hexamethylenediisocyanate (HDI, molecular weight of 168) (13.5 parts) was added thereto, and the resultant was reacted at 70° C. for 5 hours while a nitrogen gas was introduced. Polyethylene glycol (PEG#1500 manufactured by Lion Corporation, hydroxyl group value: from 187 to 224) (25 parts) was further added, and the resultant was reacted for 10 hours. Then, the solvent (toluene) was removed from the resultant with an evaporator, to thereby obtain an additive 3, which was a compound represented by General Formula (1) above in the form of a block polymer of polyolefin-PEG containing a urethane bond. The number average molecular weight of the additive 3 was 85,000.

Synthesis of Additive 4

Preparation of Bromo Polyethylene Oxide

Triethylamine (0.505 parts) was mixed with distilled 4-dimethylaminopyridine (DMAP) (0.915 parts) and dry methylene chloride (20 parts). The resultant was added to a three-necked flask under a nitrogen atmosphere, and cooled to 0° C. while being stirred with a stirrer, to which a solution obtained by dissolving 2-bromoisobutyrylbromide (2.875 parts) in methylene chloride (20 parts) was added. Then, polyethylene glycol (product No. 202444 manufactured by Sigma-Aldrich Co., LLC., Mn: 3,350) (25 parts) as polyethylene oxide (PEO) was dropped down to dry methylene chloride (100 parts) in 1 hour at room temperature, and the resultant was stirred for 18 hours.

The resultant was filtered, the solvent was distilled away at a pressure reduced to half, and a macroinitiator of bromo polyethylene oxide (PEO-Br) was precipitated in cooled diethyl ether. The obtained precipitate was dissolved in absolute alcohol, and recrystallized for 1 day. The obtained macroinitiator was filtered, washed with cooled diethyl ether, and suction-dried.

Synthesis of Additive 4 (PEO-b-PMMA)

Polymerization by atom transfer radical polymerization (ATRP) was performed in a chlorobenzene solution. A glass tube was filled with PEO-Br (0.250 parts), methyl methacrylate (MMA) (0.500 parts), CuBr (0.0072 parts), bipyridine (0.0234 parts), and chlorobenzene (1.125 parts). They were deaerated by freeze-pump-thaw technique and sealed at a reduced pressure. After this, they were heated to 50° C., and after a while, cooled to room temperature. The obtained mixture solution was dissolved in tetrahydrofuran (THF), passed through a column to be purified with separation of the catalyst, and precipitated in ether. The polymer obtained in this way was dried under reduced pressure for one night at room temperature, and after this, purified, to thereby obtain an additive 4, which was a compound represented by General Formula (1) above in the form of a block polymer (PEO-b-PMMA) of PEO and polymethyl methacrylate (PMMA). The number average molecular weight of the additive 4 was 19,700.

Example 1

<Manufacture of Resin Composition 1>

Polypropylene (NOVATEC PP EA9 manufactured by Japan Polypropylene Corporation, MFR: 0.5 g/10 min) (87 parts), carbon black as an electro-conductive agent (DENKA BLACK manufactured by Denki Kagaku Kogyo Kabushiki Kaisha) (8 parts), and the additive 1 obtained above (5 parts) were melt-kneaded at 200° C. with a LABOPLASTO biaxial extruder (manufactured by Toyo Seiki Seisaku-sho, Ltd.). Then, the resultant was passed through coolant water, and pelletized with a pelletizer (TSM-125 manufactured by Tanaka Co., Ltd., 100 kg/hour), to thereby obtain a resin composition 1 in a pellet form. The composition of the resin composition 1 is shown in Table 1.

<Manufacture of Seamless Belt 1>

The obtained resin composition 1 was fed to a uniaxial melt-kneader (GT-40 manufactured by Plastics Technology Co., Ltd.) from a hopper. With the temperature appropriately adjusted in the range of from 160° C. to 250° C., the resin was poured into a cylindrical mold, and the take-over speed was appropriately adjusted in the range of from 1 m/min to 3 m/min, to thereby obtain a cylindrical molding. The mold used had an outlet diameter $\phi$ of 207 mm, and had a spirally cut groove. After the resin was extruded from the mold, it was passed through an inner mold of which temperature was adjusted to 20° C. to 90° C., while the outer side was water-cooled. The obtained cylindrical molding was cut at an end, to thereby obtain a seamless belt 1 having a width of 225 mm, a circumferential length of 650 mm, and a thickness of 135 µm.

The obtained seamless belt 1 was scanned for DSC with a differential scanning calorimeter (DSC6100 manufactured by Seiko Instruments, Inc.) at 10° C./min under a nitrogen gas atmosphere in the range of from −30° to 250° C. As a result, a melting point attributed to POLYTAIL (Registered Trademark) of the additive 1 was observed at about 30° C. to 60° C.

<Manufacture of Image Forming Apparatus 1>

The obtained seamless belt 1 was mounted as an intermediate transfer belt on an intermediate transfer unit of a printer IPSIO C310 (manufactured by Ricoh Company Ltd.), to thereby manufacture an image forming apparatus 1 of Example 1.

<Evaluation>

Evaluation of the manufactured seamless belt was performed as follows. The results are shown in Table 2.

<<Surface Resistivity>>

The additive amount of the electro-conductive agent in the resin composition of Example 1 (and of Examples and Comparative Examples to be described later) was adjusted so that a value that is in the intermediate resistance range (from $1\times10^6\Omega/\square$ to $1\times10^{11}\Omega/\square$ in terms of surface resistivity), which is difficult to control, and besides, that is a value to the ninth power may be obtained as the surface resistivity. To see whether the target surface resistivity was actually obtained, the surface resistivity of the manufactured seamless belt was measured and evaluated based on the following evaluation criteria.

The surface resistivity was a value obtained when a voltage of 500 (V) was applied to the seamless belt 500 with a high-restor (manufactured by Yukadenshi Co., Ltd.).

—Evaluation Criteria—

A: The surface resistivity was a value to the ninth power ($1\times10^9 \Omega/\square$ or higher but lower than $1\times10^{10}\Omega/\square$).

B: The surface resistivity was a value to the eighth power or the tenth power ($1\times10^8\Omega/\square$ or higher but lower than $1\times10^9\Omega/\square$, or $1\times10^{10}\Omega/\square$ or higher but lower than $1\times10^{11}\Omega/\square$).

C: The surface resistivity was a value to the sixth power, the seventh power, or the eleventh power ($1\times10^6\Omega/\square$ or higher but lower than $1\times10^8\Omega/\square$, or $1\times10^{11}\Omega/\square$ or higher but lower than $1\times10^{12}\Omega/\square$).

D: The surface resistivity was a value to the fifth or lower power or the twelfth or higher power (lower than $1\times10^6\Omega/\square$, or $1\times10^{12}\Omega/\square$ or higher).

<<Voltage Dependency>>

As for voltage dependency, voltages of 100 V and 500 V were applied to measure and evaluate $\log_{10}R_{100}$-$\log_{10}R_{500}$ (where $R_{100}$ represents surface resistivity ($\Omega/\square$) at an applied voltage of 100 V, and $R_{500}$ represents surface resistivity ($\Omega/\square$) at an applied voltage of 500 V).

When the value "$\log_{10}R_{100}$-$\log_{10}R_{500}$" was 4 or less (i.e., when a voltage-dependent change of the surface resistivity was a value with 4 digits or less), the sample was suitable for practical use.

—Evaluation Criteria—

A: $\log_{10}R_{100}$-$\log_{10}R_{500}$ was 2 or less.
B: $\log_{10}R_{100}$-$\log_{10}R_{500}$ was 3 or less but greater than 2.
C: $\log_{10}R_{100}$-$\log_{10}R_{500}$ was 4 or less but greater than 3.
D: $\log_{10}R_{100}$-$\log_{10}R_{500}$ was greater than 4.

<<Degree of Glossiness>>

The degree of glossiness was measured with a glossimeter (PG-II manufactured by Nippon Denshoku Industries, Co., Ltd.) at an incident angle of 60 degrees, and evaluated based on the following evaluation criteria.

The degree of glossiness is a value that can be referenced as an indicator of whether a desired amount of reflection light can be obtained or not. When the degree of glossiness is 30 or greater, a desired amount of reflection light can be obtained from the sample, and the sample is suitable for practical use.

When the degree of glossiness is less than 30, it is necessary to increase the current value for the light emission of the sensor in order to obtain a desired amount of reflection light. Depending on any variations of the sensor, the current value for the light emission may exceed the output limit.

—Evaluation Criteria—

A: The degree of glossiness was 50 or greater.
B: The degree of glossiness was 40 or greater but less than 50.
C: The degree of glossiness was 30 or greater but less than 40.
D: The degree of glossiness was less than 30.

<<Tensile Elongation at Break>>

The tensile elongation at break was measured with a tensile tester (AGX50 manufactured by Shimadzu Corporation) according to JIS K7127.

When the tensile elongation at break is 20% or greater, the sample is suitable for practical use.

—Evaluation Criteria—

A: The tensile elongation at break was 100% or greater.
B: The tensile elongation at break was 50% or greater but less than 100%.
C: The tensile elongation at break was 20% or greater but less than 50%.
D: The tensile elongation at break was less than 20%.

<<Image>

With the manufactured image forming apparatus, a chart for image evaluation was printed at a temperature of 25° at a humidity of 50% RH. The sheet used was MYPAPER (manufactured by Ricoh Company Ltd.). The image quality of the obtained image was evaluated based on the following evaluation criteria.

—Evaluation Criteria—

B: No or almost no transfer failure was found.
C: A transfer failure was found, but was not problematic for practical use.
D: A transfer failure was found and was problematic for practical use.

Examples 2 to 4

The resin compositions 2 to 4, the seamless belts 2 to 4, and the image forming apparatuses 2 to 4 of Examples 2 to 4 were manufactured in the same manner as Example 1, except that the additives 2 to 4 were used as shown in Table 1 instead of the additive 1 of Example 1. The manufactured samples were evaluated, and the results are shown in Table 2.

Examples 5 to 8

The resin compositions 5 to 8, the seamless belts 5 to 8, and the image forming apparatuses 5 to 8 of Examples 5 to 8 were manufactured in the same manner as Example 1, except that the amounts of the electro-conductive agent and polyolefin used in Example 1 were changed as shown in Table 1. The manufactured samples were evaluated, and the results are shown in Table 2.

Example 9

The resin composition 9, the seamless belt 9, and the image forming apparatus 9 of Example 9 were manufactured in the same manner as Example 1, except that the electro-conductive agent was changed from carbon black (8 parts) used in Example 1 to tin oxide (manufactured by Mitsubishi Materials Corporation) (20 parts), and the amount of polypropylene was changed from 87 parts of Example 1 to 75 parts as shown in Table 1. The manufactured samples were evaluated, and the results are shown in Table 2.

Comparative Example 1

The resin composition A, the seamless belt A, and the image forming apparatus A of Comparative Example 1 were manufactured in the same manner as Example 1, except that the amount of polypropylene was changed from 87 parts of Example 1 to 92 parts, and the additive 1 of Example 1 was not added as shown in Table 1. The manufactured samples were evaluated, and the results are shown in Table 2.

Comparative Example 2

The resin composition B, the seamless belt B, and the image forming apparatus B of Comparative Example 2 were manufactured in the same manner as Example 1, except that the amount of polypropylene was changed from 87 parts of Example 1 to 97 parts, and no carbon black was added, and sodium dodecylbenzenesulfonate (3 parts) was added as a surfactant instead of the additive 1 of Example 1 as shown in Table 1. The manufactured samples were evaluated, and the results are shown in Table 2.

TABLE 1

| | Polyolefin | | Electro-conductive agent | | Additive | |
|---|---|---|---|---|---|---|
| | Kind | Part | Kind | Part | Kind | Part |
| Ex. 1 | Polypropylene | 87 | Carbon black | 8 | Additive 1 | 5 |
| Ex. 2 | Polypropylene | 87 | Carbon black | 8 | Additive 2 | 5 |
| Ex. 3 | Polypropylene | 87 | Carbon black | 8 | Additive 3 | 5 |
| Ex. 4 | Polypropylene | 87 | Carbon black | 8 | Additive 4 | 5 |
| Ex. 5 | Polypropylene | 88 | Carbon black | 7 | Additive 1 | 5 |
| Ex. 6 | Polypropylene | 86 | Carbon black | 9 | Additive 1 | 5 |
| Ex. 7 | Polypropylene | 89 | Carbon black | 6 | Additive 1 | 5 |
| Ex. 8 | Polypropylene | 85 | Carbon black | 10 | Additive 1 | 5 |
| Ex. 9 | Polypropylene | 75 | Tin oxide | 20 | Additive 1 | 5 |
| Comp. Ex. 1 | Polypropylene | 92 | Carbon black | 8 | — | 0 |
| Comp. Ex. 2 | Polypropylene | 97 | — | 0 | Surfactant | 3 |

TABLE 2

| | Surface resistivity | Voltage dependency | Degree of glossiness | Tensile elongation at break | Image |
|---|---|---|---|---|---|
| Ex. 1 | A | B | B | B | B |
| Ex. 2 | A | B | B | B | B |
| Ex. 3 | A | B | B | B | B |
| Ex. 4 | A | B | A | B | B |
| Ex. 5 | B | B | A | A | B |
| Ex. 6 | B | B | B | C | B |
| Ex. 7 | C | C | A | A | C |
| Ex. 8 | B | C | B | C | C |
| Ex. 9 | C | B | C | C | C |
| Comp. Ex. 1 | D | D | C | D | B |
| Comp. Ex. 2 | D | A | A | B | B |

Example 10

<Manufacture of Resin Composition 10>

Polypropylene (NOVATEC PP EA9 manufactured by Japan Polypropylene Corporation, MRF: 0.5 g/10 min) (85 parts), carbon black (DENKA BLACK manufactured by Denki Kagaku Kogyo Kabushiki Kaisha) (10 parts) as an electro-conductive agent, the additive 1 obtained above (5 parts), and an antioxidant IRGANOX 1010 (manufactured by BASF Japan Ltd.) (0.05 parts) were melt-kneaded at 200° C. with a LABOPLASTO biaxial extruder (manufactured by Toyo Seiki Seisaku-sho, Ltd.). Then, they were passed through coolant water, and pelletized with a pelletizer (TSM-125 manufactured by Tanaka Co., Ltd., 100 kg/hour), to thereby obtain a resin composition 10 in a pellet form.

<Manufacture of Seamless Belt 10>

The obtained resin composition 10 was fed to a uniaxial melt-kneader (TG-40 manufactured by Plastics Technology Co., Ltd.) from a hopper. With the temperature appropriately adjusted in the range of from 160° C. to 250° C., the resin was poured into a cylindrical mold, and the take-over speed was appropriately adjusted in the range of from 1 m/min to 3 m/min, to thereby obtain a cylindrical molding. The mold used had an outlet diameter $\phi$ of 207 mm, and had a spirally cut groove. After the resin was extruded from the mold, it was passed through an inner mold of which temperature was adjusted to 20° C. to 90° C., while the outer side was water-cooled. The obtained cylindrical molding was cut at an end, to thereby obtain a seamless belt 10 having a width of 225 mm, a circumferential length of 650 mm, and a thickness of 135 µm.

<Manufacture of Image Forming Apparatus 10>

The obtained seamless belt 10 was mounted as an intermediate transfer belt on an intermediate transfer unit of a printer IPSIO C310 (manufactured by Ricoh Company Ltd.), to thereby manufacture an image forming apparatus 10 of Example 10.

The composition and blending of the obtained resin composition 10 are shown in Table 3. The resin composition 10, the seamless belt 10, and the image forming apparatus 10 were evaluated in terms of the evaluation points of Example 1, and additionally in terms of surface property, and standard deviation $\sigma$ of reflection output voltage Vsg. The evaluation results are shown in Table 4.

<<Surface Property>>

Surface property was evaluated from the obtained seamless belt, based on the following evaluation criteria.

—Evaluation Criteria—

A: No dot-shaped defects (lumps) or linear-shaped defects (stripes) were found at all.

B: Almost no dot-shaped or linear-shaped defects were found.

C: Dot-shaped or linear-shaped defects were found, but not problematic for practical use.

D: Dot-shaped or linear-shaped defects were found, and problematic for practical use.

<<Measurement of Reflection Output Voltage Vsg and Standard Deviation $\sigma$>>

With a toner concentration sensor on the seamless belt 10 of the image forming apparatus 10, reflection output voltages were measured from the whole circumference of the belt and averaged as reflection output voltage Vsg. Then, to obtain an indicator of the dispersion of Vsg, the standard deviation $\sigma$ of Vsg was divided by Vsg, and the obtained value ($\sigma$/Vsg) was evaluated based on the following evaluation criteria. When $\sigma$/Vsg is 0.50 or less, the sample was not problematic for practical use.

—Evaluation Criteria—

A: $\sigma$/Vsg was 0.10 or less.

B: $\sigma$/Vsg was 0.30 or less but greater than 0.10.

C: $\sigma$/Vsg was 0.50 or less but greater than 0.30.

D: $\sigma$/Vsg was greater than 0.50.

Figure 3A:
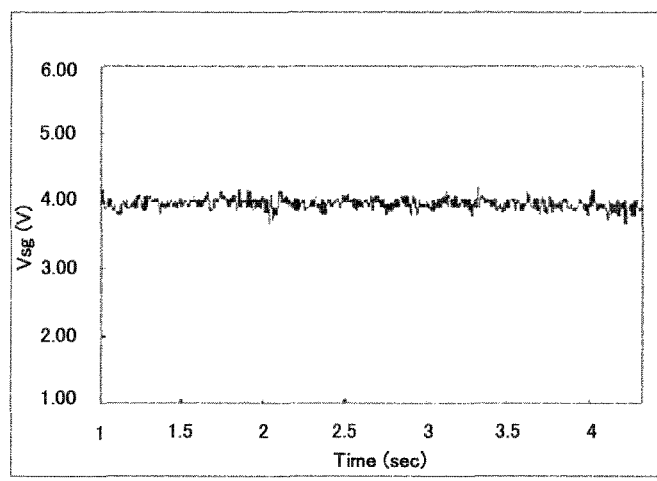
FIG. 3A is a graph showing relationship between reflection output voltage Vsg and time, when a seamless belt of Example 10 is used.
Figure 3B:
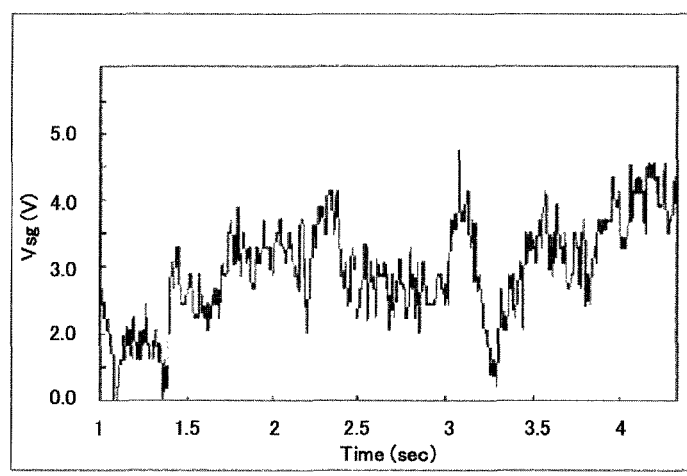
FIG. 3B is a graph showing relationship between reflection output voltage Vsg and time, when dispersion of Vsg is large.

FIG. 3A is a graph showing relationship between reflection output voltage Vsg and time, when the seamless belt 10 of Example 10 was used. FIG. 3B is a graph showing relationship between reflection output voltage Vsg and time, when dispersion of Vsg was large. The vertical axis represents reflection output voltage Vsg, and the horizontal axis represents time. Here, the seamless belt having a circumferential length of 650 mm was rotated at a system speed of 150 mm/sec. Therefore, one rotation of the seamless belt took 4.33 seconds.

Example 11

<Manufacture of Resin Composition 11>

Polypropylene (product No. 427896 manufactured by Sigma-Aldrich Co., LLC., Mn: 50,000, Tm: from 160° C. to 165° C., MFR: 35 g/10 min) (72 parts), polypropylene (product No. 452149, Sigma-Aldrich Co., LLC., Mn 75,000, Tm: 125° C., MRF: 2.2 g/10 min) (15 parts), carbon black (DENKA BLACK manufactured by Denki Kagaku Kogyo Kabushiki Kaisha) (10 parts), and the additive 1 (5 parts) were melt-kneaded at 200° C. with a LABOPLASTO biaxial extruder (manufactured by Toyo Seiki Seisaku-sho, Ltd.). Then, they were passed through coolant water, and pelletized with a pelletizer (TSM-125 manufactured by Tanaka Co., Ltd., 100 kg/hour), to thereby obtain a resin composition 11 in a pellet form.

The molecular weight distribution was measured by GPC, and two peaks were observed at Mn of 50,000 and 75,000.

<Manufacture of Seamless Belt 11 and Image Forming Apparatus 11>

The seamless belt 11 and the image forming apparatus 11 of Example 11 were manufactured in the same manner as Example 10, except that the resin composition 10 of Example 10 was changed to the resin composition 11.

The obtained seamless belt 11 was evaluated in the same manner as Example 10. The results are shown in Table 4.

Example 12

<Manufacture of Resin Composition 12>

Polypropylene (product No. 427861 manufactured by Sigma-Aldrich Co., LLC., Mn: 97,000, Tm: 160° C. to 165° C., MFR: 4 g/10 min) (72 parts), polyethylene-propylene copolymer [product No. 429139 manufactured by Sigma-Aldrich Co., LLC., Tm; 128° C., MFR: 30 g/min] (15 parts), carbon black (DENKA BLACK manufactured by Denki Kagaku Kogyo Kabushiki Kaisha) (10 parts), and the additive 1 (5 parts) were melt-kneaded at 200° C. with a LABO-PLASTO biaxial extruder (manufactured by Toyo Seiki Seisaku-sho, Ltd.). Then, they were passed through coolant water, and pelletized with a pelletizer (TSM-125 manufactured by Tanaka Co., Ltd., 100 kg/hour), to thereby obtain a resin composition 12 in a pellet form.

<Manufacture of Seamless Belt 12 and Image Forming Apparatus 12>

The seamless belt 12 and the image forming apparatus 12 of Example 12 were manufactured in the same manner as Example 10, except that the resin composition 10 of Example 10 was changed to the resin composition 12.

The obtained seamless belt 12 was evaluated in the same manner as Example 10. The results are shown in Table 4.

Example 13

<Manufacture of Resin Composition 13>

Polyvinylidene fluoride (KYNAR (Registered Trademark) 720 manufactured by Arkema K.K.) (72 parts), polyvinylidene fluoride copolymer (KYNARFLEX (Registered Trademark) 2750 manufactured by Arkema K.K.) (15 parts), carbon black (DENKA BLACK manufactured by Denki Kagaku Kogyo Kabushiki Kaisha) (10 parts), and the additive 1 (5 parts) were melt-kneaded at 200° C. with a LABO-PLASTO biaxial extruder (manufactured by Toyo Seiki Seisaku-sho Ltd.). Then, they were passed through coolant water, and pelletized with a pelletizer (TSM-125 manufactured by Tanaka Co., Ltd., 100 kg/hour), to thereby obtain a resin composition 13 in a pellet form.

<Manufacture of Seamless Belt 13 and Image Forming Apparatus 13>

The seamless belt 13 and the image forming apparatus 13 of Example 13 were manufactured in the same manner as Example 10, except that the resin composition 10 of Example 10 was changed to the resin composition 13.

The obtained seamless belt 13 was evaluated in the same manner as Example 10. The results are shown in Table 4.

Furthermore, flame retardancy of the seamless belt 13 of Example 13 was evaluated according to ASTM D4804. The result was "VTM-1" (no ignition due to abnormal electrical discharge occurred), which meant excellent flame retardancy.

TABLE 3

| | Polyolefin | | Electro-conductive agent | | Additive | |
|---|---|---|---|---|---|---|
| | Kind | Part | Kind | Part | Kind | Part |
| Ex. 10 | Polypropylene | 87 | Carbon black | 8 | Additive 1 | 5 |
| Ex. 11 | Polypropylene | 87 | Carbon black | 8 | Additive 1 | 5 |
| Ex. 12 | Polypropylene | 72 | Carbon black | 8 | Additive 1 | 5 |
| | Polyethylene-propylene copolymer | 15 | | | | |
| Ex. 13 | PVDF | 72 | Carbon black | 8 | Additive 1 | 5 |
| | VDF + HFP | 15 | | | | |

TABLE 4

| | Surface resistivity | Voltage dependency | Degree of glossiness | Tensile elongation at break | Surface property | σ/Vsg | Image |
|---|---|---|---|---|---|---|---|
| Ex. 10 | A | A | C | C | B | B | B |
| Ex. 11 | A | A | C | B | B | B | B |
| Ex. 12 | A | A | C | A | A | B | B |
| Ex. 13 | A | A | A | A | A | B | B |

Example 14

<Manufacture of Seamless Belt 14 and Image Forming Apparatus 14>

The seamless belt 14 and the image forming apparatus 14 of Example 14 were manufactured in the same manner Example 10, except that the take-over speed of 1 m/min to 3 m/min of Example 10 was changed to 0.1 m/min to 0.5 m/min.

Surface resistivity, voltage dependency, degree of glossiness, tensile elongation at break, and σ/Vsg of the manufactured seamless belt 14 were evaluated in the same manner as Example 10. The results are shown in Tables 5-1 and 5-2.

As for the resin composition 10 and seamless belt 10 of Example 10, and for the seamless belt 14 of Example 14, an amount of heat of melting ΔH1 (J/g) at the first temperature raising, and an amount of heat of melting ΔH2 (J/g) at the second temperature raising were measured according to the following DSC measurement. The results are shown in Table 5-2.

<<Measurement of ΔH1 and ΔH2>>

The amount of heat of melting ΔH1 (J/g) at the first temperature raising, and the amount of heat of melting ΔH2 (J/g) at the second temperature raising were measured under the following DSC measurement conditions.

—DSC Measurement Conditions—

Temperature profile: room temperature→−30° C.→250° C.→−30° C.→250° C.→End

Temperature raising rate: 10° C./min

Atmosphere: nitrogen gas (20 ml/min)

Instrument: DSC6200 manufactured by Seiko Instruments, Inc.

Amount of sample: 5.5 mg±0.5 mg

First temperature raising: the first raising from −30° C. to 250° C.

Second temperature raising: the second raising from −30° C. to 250° C.

Amounts of heat of melting at from 140° C. to 200° C. were measured as the amounts of heat of melting ΔH1 and ΔH2 (J/g).

TABLE 5-1

| | | Surface resistivity | Voltage dependency | Degree of glossiness | Tensile elongation at break |
|---|---|---|---|---|---|
| Ex. 10 | Resin composition 10 | — | — | C | — |
| | Seamless belt 10 | A | A | C | C |
| Ex. 14 | Seamless belt 14 | A | A | C | B |

TABLE 5-2

| | | ΔH1 (J/g) | ΔH2 (J/g) | (ΔH2 − ΔH1) × 100ΔH1 | σ/Vsg |
|---|---|---|---|---|---|
| Ex. 10 | Resin composition 10 | 39.5 | 40.0 | 1.27 | B |
| | Seamless belt 10 | 32.0 | 41.0 | 28.13 | B |
| Ex. 14 | Seamless belt 14 | 31.0 | 41.0 | 32.26 | C |

Example 15

<Manufacture of Resin Composition 15>

Polypropylene homopolymer (F109V manufactured by Prime Polymer Co., Ltd., MFR: 30 g/10 min) (72 parts) as homopolymer polyolefin-based resin, propylene random polymer (F329RA manufactured by Prime Polymer Co., Ltd., MFR: 25 g/10 min) (15 parts) as copolymer, carbon black (DENKA BLACK manufactured by Denki Kagaku Kogyo Kabushiki Kaisha) (10 parts), and the additive 1 (5 parts) were melt-kneaded at 200° C. with a LABOPLASTO biaxial extruder (manufactured by Toyo Seiki Seisaku-sho Ltd.). Then, they were passed through coolant water, and pelletized with a pelletizer (TSM-125 manufactured by Tanaka Co., Ltd., 100 kg/hour), to thereby obtain a resin composition 15 in a pellet form.

<Manufacture of Seamless Belt 15 and Image Forming Apparatus 15>

The seamless belt 15 and the image forming apparatus 15 of Example 15 were manufactured in the same manner as Example 10, except that the resin composition 10 of Example 10 was changed to the resin composition 15.

Example 16

<Manufacture of Resin Composition 16, Seamless Belt 16 and Image Forming Apparatus 16>

The resin composition 16, the seamless belt 16, and the image forming apparatus 16 of Example 16 were manufactured in the same manner as Example 15, except that polypropylene homopolymer (F-704NP manufactured by Prime Polymer Co., Ltd., MFR: 7 g/10 min) was used as homopolymer polyolefin-based resin instead of the polypropylene homopolymer (F109V manufactured by Prime Polymer Co., Ltd., MFR: 30 g/10 min) used in Example 15.

Example 17

<Manufacture of Resin Composition 17, Seamless Belt 17, and Image Forming Apparatus 17>

The resin composition 17, the seamless belt 17, and the image forming apparatus 17 of Example 17 were manufactured in the same manner as Example 16, except that propylene random polymer (F-744NP manufactured by Prime Polymer Co., Ltd., MFR: 7.0 g/10 min) was used as copolymer instead of the propylene random polymer (F329RA manufactured by Prime Polymer Co., Ltd., MFR: 25 g/10 min) used in Example 16.

As for the seamless belts 15 to 17 manufactured as above and for the seamless belt 12, the absolute value of the difference between MFR(a) of the homopolymer and MFR(b) of the copolymer, tensile elongation at break, and standard deviation σ of Vsg were evaluated. The results are shown in Tables 6-1 and 6-2.

<<Measurement of MFR(a) of Homopolymer and MFR(b) of Copolymer>>

The values of MFR(a) of polyolefin homopolymer and MFR(b) of copolymer presented above were values measured according to JIS K7210 at the temperature of the resin composition (2.16 Kg) of 230° C. for 1 minute. The absolute value of the difference between MFR(a) of the homopolymer and MFR(b) of the copolymer is shown in Table 6-2.

When the absolute value is from 0.1 to 50, the sample is suitable for practical use.

—Evaluation Criteria—
A: The absolute value was from 1 to 20.
B: The absolute value was 0.1 or greater but less than 1, or 30 or less but greater than 20.
C: The absolute value was 50 or less but greater than 30.
D: The absolute value was 90 or less but greater than 60.

TABLE 6-1

| | Surface resistivity | Voltage dependency | Degree of glossiness | Tensile elongation at break |
|---|---|---|---|---|
| Ex. 15 | A | A | C | B |
| Ex. 16 | A | A | C | B |
| Ex. 17 | A | A | B | C |
| Ex. 12 | A | A | C | A |

TABLE 6-2

| | Homopolymer (a) | Copolymer (b) | |(a) − (b)| | σ/Vsg |
|---|---|---|---|---|
| Ex. 15 | 7 | 25 | 18 | A |
| Ex. 16 | 30 | 25 | 5 | A |
| Ex. 17 | 7 | 7.1 | 0.1 | B |
| Ex. 12 | 4 | 30 | 26 | B |

Aspects of the present invention are as follows, for example.

<1> A resin composition, including:
polyolefin in an amount of from 50% by mass to 90% by mass;
an electro-conductive agent; and
a compound represented by General Formula (1) below,

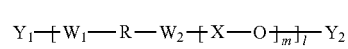

General Formula (1)

where in General Formula (1), l and m represent natural numbers, R represents straight-chain or branched alkylene group having 20 or more carbon atoms, a divalent group having a number average molecular weight of 1,000 or greater and represented by General Formula (2) below, or a divalent group derived from acrylic polymer, polyurethane, or polyamide and having a number average molecular weight of 1,000 or greater when m is 20 or greater, or R represents a divalent group having a number average molecular weight of 1,000 or greater and represented by General Formula (2) below when m is 19 or less, $Y_1$ and $Y_2$ may be same as or different from each other, and represent hydrogen atom, alkyl group having 1 to 7 carbon atoms, aralkyl group having 1 to 7 carbon atoms, or aryl group having 1 to 7 carbon atoms, X represents alkylene group having 1 to 4 carbon atoms, $W_1$ and $W_2$ may be same as or different from each other, and represent ester group, ether group, amino group, amide group, carbonate group, acid anhydride group, urethane group, urea group, or atomic bonding,

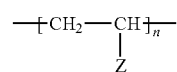

General Formula (2)

where in General Formula (2), n represents a natural number, Z represents hydrogen atom, methyl group, phenyl group, or —O—$R_1$, and $R_1$ represents straight-chain or branched alkyl group having 1 to 4 carbon atoms.

<2> The resin composition according to <1>,
wherein in General Formula (1), R represents a divalent group having a number average molecular weight of 1,000 or greater and derived from acrylic polymer.

<3> The resin composition according to <1> or <2>,
wherein the resin composition satisfies Mathematical Formula (1) below, $$1 \leq (\Delta H2 - \Delta H1) \times 100 / \Delta H1 \leq 30 \quad \text{Mathematical Formula (1)}$$

where $\Delta H1$ represents an amount of heat of melting $\Delta H$ (J/g) of the resin composition at a first temperature raising of differential scanning calorimetry (DSC), and $\Delta H2$ represents an amount of heat of melting $\Delta H$ (J/g) of the resin composition at a second temperature raising of DSC.

<4> The resin composition according to any one of <1> to <3>,
wherein a molecular weight distribution of the polyolefin measured by gel permeation chromatography (GPC) includes 2 or more peaks.

<5> The resin composition according to any one of <1> to <4>,
wherein the polyolefin includes a homopolymer and a copolymer.

<6> The resin composition according to <5>,
wherein the resin composition satisfies Mathematical Formula (2) below, $$1 \leq |(a)-(b)| \leq 20 \quad \text{Mathematical Formula (2)}$$

where (a) represents melt flow rate (MFR) of the homopolymer of the polyolefin, and (b) represents MFR of the copolymer of the polyolefin.

<7> The resin composition according to <5> or <6>,
wherein the homopolymer of the polyolefin is polyvinylidene fluoride, and
wherein the copolymer of the polyolefin is a copolymer that includes vinylidene fluoride and hexafluoropropylene as monomer components.

<8> A seamless belt, including
the resin composition according to any one of <1> to <7>,
wherein the seamless belt is made of the resin composition.

<9> The seamless belt according to <8>,
wherein a value (σ/Vsg) obtained by dividing a standard deviation σ of reflection output voltage Vsg (V) of the seamless belt by Vsg is 0.10 or less.

<10> An image forming apparatus, including:
an electrostatic latent image bearing member;
an electrostatic latent image forming unit configured to form an electrostatic latent image on the electrostatic latent image bearing member;
a developing unit configured to develop the electrostatic latent image with a toner to form a visible image; and
a transfer unit configured to transfer the visible image onto a recording medium,
wherein the image forming apparatus further includes the seamless belt according to <8> or <9>.

This application claims priority to Japanese application No. 2013-036991, filed on Feb. 27, 2013 and incorporated herein by reference.

What is claimed is:
1. A resin composition, comprising:
a polyolefin in an amount of from 50% by mass to 90% by mass based on the total mass of resin composition;
an electro-conductive agent; and
a compound, oligomer, or polymer represented by General Formula (1) below,

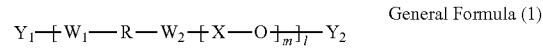

General Formula (1)

where in General Formula (1), l and m represent natural numbers, R represents straight-chain or branched alkylene group having 20 or more carbon atoms, a divalent group having a number average molecular weight of 1,000 or greater and represented by General Formula (2) below, or a divalent group derived from acrylic polymer, polyurethane, or polyamide and having a number average molecular weight of 1,000 or greater when m is 20 or greater, or R represents a divalent group having a number average molecular weight of 1,000 or greater and represented by General Formula (2) below when m is 19 or less, $Y_1$ and $Y_2$ may be same as or different from each other, and represent hydrogen atom, alkyl group having 1 to 7 carbon atoms, aralkyl group having 1 to 7 carbon atoms, or aryl group having 1 to 7 carbon atoms, X represents alkylene group having 1 to 4 carbon atoms, $W_1$ and $W_2$ may be same as or different from each other, and represent ester group, ether group, amino group, amide group, carbonate group, acid anhydride group, urethane group, urea group, or a single bond,

General Formula (2)

where in General Formula (2), n represents a natural number, Z represents hydrogen atom, methyl group, phenyl group, or —O—$R_1$, and $R_1$ represents straight-chain or branched alkyl group having 1 to 4 carbon atoms,
wherein the polyolefin includes both a homopolymer and a copolymer, and
wherein the resin composition satisfies Mathematical Formula (2) below, $$1 \leq |(a)-(b)| \leq 20 \quad (2)$$

where (a) represents melt flow rate (MFR) of the homopolymer of the polyolefin, and (b) represents MFR of the copolymer of the polyolefin.

2. The resin composition according to claim 1,
wherein in General Formula (1), R represents a divalent group having a number average molecular weight of 1,000 or greater when m is 20 or greater and derived from acrylic polymer.

3. The resin composition according to claim 1,
wherein the resin composition satisfies Mathematical Formula (1) below, $$1 \leq (\Delta H2 - \Delta H1) \times 100 / \Delta H1 \leq 30 \quad \text{Mathematical Formula (1)}$$

where ΔH1 represents an amount of heat of melting ΔH (J/g) of the resin composition at a first temperature raising of differential scanning calorimetry (DSC), and ΔH2 represents an amount of heat of melting ΔH (J/g) of the resin composition at a second temperature raising of DSC.

4. The resin composition according to claim 1,
wherein a molecular weight distribution of the polyolefin measured by gel permeation chromatography (GPC) comprises 2 or more peaks.

5. The resin composition according to claim 1,
wherein the homopolymer of the polyolefin is polyvinylidene fluoride, and
wherein the copolymer of the polyolefin is a copolymer that comprises vinylidene fluoride and hexafluoropropylene as monomer components.

\* \* \* \* \*